(12) United States Patent
Madhavan et al.

(10) Patent No.: US 8,238,896 B2
(45) Date of Patent: *Aug. 7, 2012

(54) CELLULAR VOICE CHANNEL ORIGINATION FOR VEHICLE COMMUNICATION WITH A CALL CENTER

(75) Inventors: Sethu K. Madhavan, Canton, MI (US); Ki Hak Yi, Windsor (CA)

(73) Assignee: General Motors LLC, Detroit, MI (US)

( * ) Notice: Subject to any disclaimer, the term of this patent is extended or adjusted under 35 U.S.C. 154(b) by 396 days.

This patent is subject to a terminal disclaimer.

(21) Appl. No.: 12/541,531

(22) Filed: Aug. 14, 2009

(65) Prior Publication Data

US 2011/0039537 A1    Feb. 17, 2011

(51) Int. Cl.
*H04W 4/00* (2009.01)
*H04W 24/00* (2009.01)
(52) U.S. Cl. ............................ 455/422.1; 370/328
(58) Field of Classification Search ............... 455/422.1, 455/466; 370/328
See application file for complete search history.

(56) References Cited

U.S. PATENT DOCUMENTS

| | | | |
|---|---|---|---|
| 2011/0038307 A1* | 2/2011 | Madhavan et al. ............ 370/328 |
| 2011/0039537 A1* | 2/2011 | Madhavan et al. ......... 455/422.1 |
| 2011/0039538 A1* | 2/2011 | Madhavan et al. ......... 455/422.1 |
| 2011/0039586 A1* | 2/2011 | Madhavan et al. ............ 455/466 |
| 2011/0039587 A1* | 2/2011 | Madhavan et al. ............ 455/466 |

* cited by examiner

*Primary Examiner* — William D Cumming
(74) *Attorney, Agent, or Firm* — Anthony Luke Simon; Reising Ethington P.C.

(57) ABSTRACT

A system and method for making vehicle originated calls to a telematics service provider or other call center. The method includes identifying a call type associated with a desired wireless communication of speech or data to the call center, and then carrying out one of a number of different call connection processes depending on the call type. For voice channel cellular connections, an in-band modem cellular connection is preferably established in most instances using a connection retry strategy that includes primary, secondary, and possibly tertiary connection attempts each of which utilize at least one of a number of different voice and data call origination processes. The system and method can be carried out in connection with various cellular system technologies, but is especially suited for use with GSM systems.

15 Claims, 15 Drawing Sheets

Call Connection Table

| Message Category | Initiating Input | Message Type | Preferrred Call Type | Alt. Call Type | Retry Track |
|---|---|---|---|---|---|
| Collision Detection | Sensor | As specified for the trigger | VCC | None | Extended |
| Emergency | Emergency Button Press or Voice Command | 3637 | VCC and SMS | None | Extended |
| Hybrid Battery Disconnect | Sensor | 423 | VCC | None | Extended |
| Advisor | Manual Button Press or Voice Command | 72 – Roadside Assistance | VCC | None | Limited |
| Advisor VFB Only | Manual Button Press or Voice Command | 72 – Roadside Assistance | VCC | None | VFB Only |
| Enrollment | Manual Button Press or Voice Command | 36 | VCC | None | Limited |
| Vehicle Theft | Sensor | 88 | Packet | VCC | Non-VFB |
| Vehicle Data Upload | Telematics Trigger | 838 | IMCC or SMS | VCC, IMCC, or SMS | Limited |
| User Route Download | Telematics Trigger | None | Packet | IMCC | Non-VFB |

*Figure 3*

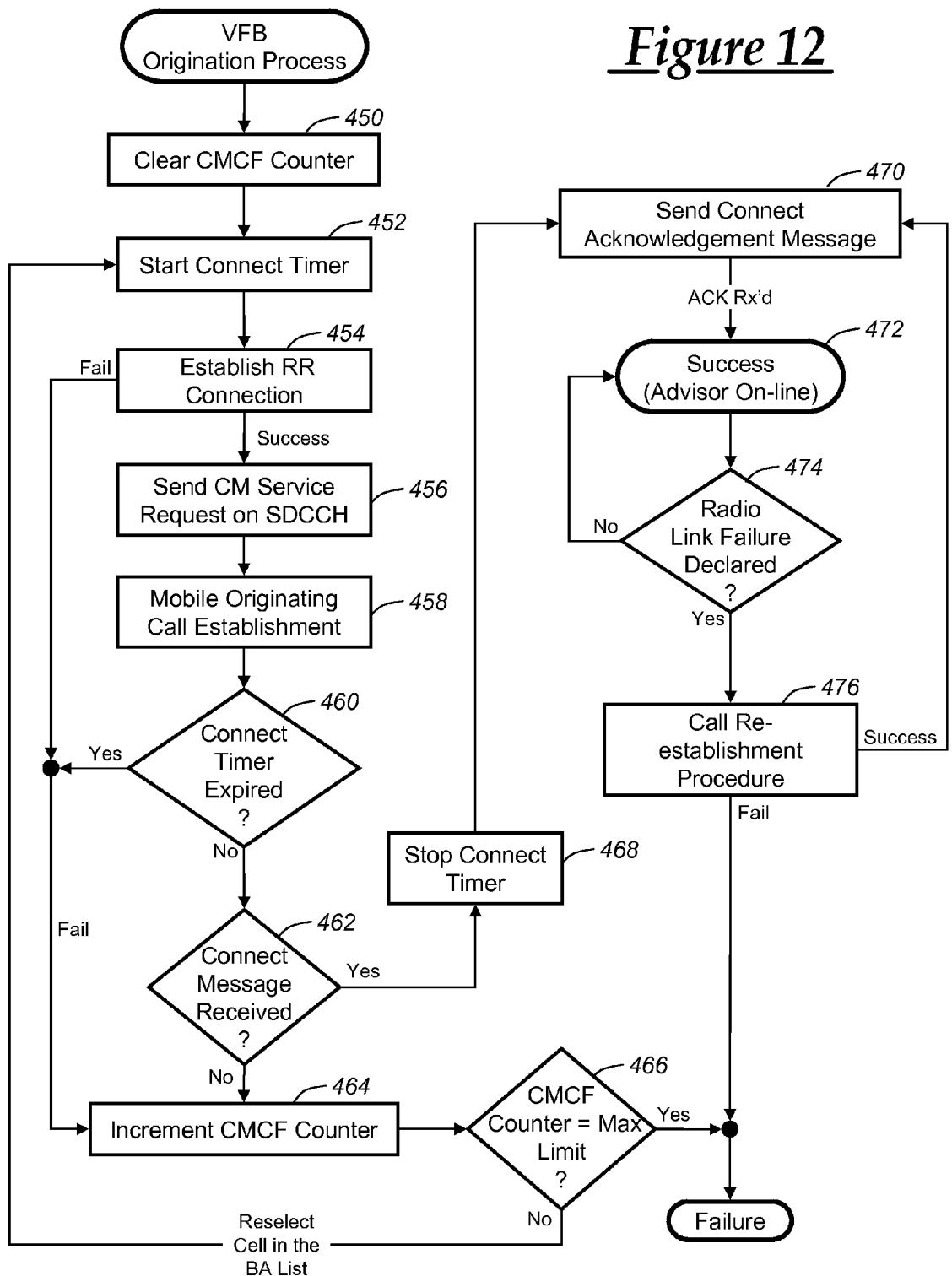

CELLULAR VOICE CHANNEL ORIGINATION FOR VEHICLE COMMUNICATION WITH A CALL CENTER

TECHNICAL FIELD

The present invention relates generally to techniques for establishing mobile vehicle originated cellular communications from a vehicle telematics unit to a remote call center.

BACKGROUND OF THE INVENTION

Vehicle telematics services carried over a public land mobile network (PLMN) or other wireless carrier system present certain challenges unique to the mobile vehicle application. For example, some vehicle telematics units (VTU) are designed to permit both voice and data communications over the wireless carrier system using one or more of the various available different transmission technologies, such as 2G CDMA (IS-95), 3G CDMA2000 (IS-2000, 1 XRTT, EVDO), 3G UTMS (W-CDMA, HSPA), 2G/2.5G GSM (GPRS and EDGE). Depending on such things as the technology used, e.g., GSM versus CDMA, the registration or acquisition process required, the frequent movement of the vehicle into and out of a home PLMN (HPLMN), the availability of one data transmission protocol versus another, and the particular type of call being made to or from the vehicle, the VTU may only have one wireless communication protocol available and suitable for use, or may have more than one from which it can select. And while multiple types of wireless transmission may be available at any one time, their associated cost of use can vary making it desirable to judiciously select among them. Similarly, call connection costs associated with data roaming can be significant and it can therefore be desirable to implement connection strategies that minimize roaming and its associated costs.

In a cellular wireless carrier systems, call origination involves connecting with the cellular network and establishing a voice or data connection to the desired endpoint equipment, such as either a telematics service call center or called party's mobile handset or landline. Data connections can be by way of a cellular network voice channel, using data compatible modems at each to exchange data, or via for example, a packet data connection such as are available over GPRS networks. While known techniques for origination of such calls can be used, vehicle telematics-based mobile originated calls present somewhat different challenges than exist for mobile handsets due to, for example, the different types of voice and data calls being placed and the variety of ways in which the VTU is used for data communication. For example, rather than being used only for placing personal voice calls by a vehicle occupant, the VTU can also be used to report data back to the call center, such as GPS data or other vehicle data including diagnostic trouble codes (DTCs) and other vehicle operational information. Some of this data may be sent automatically over a VTU-initiated call without any involvement of the vehicle drive or other occupant, whereas other such data may be desirably exchanged either at the outset or during a voice call used for communication of speech.

SUMMARY OF THE INVENTION

According to one aspect of the invention, there is provided a cellular voice channel origination method for use by a vehicle telematics unit to provide a wireless communication from the telematics unit to a call center. The method comprises the steps of: (a) attempting a radio resource connection from the telematics unit to a wireless cellular system; (b) initiating a mobile originated call to a call center via the wireless cellular system; (c) monitoring at the telematics unit for receipt of a connect message; (d) sending a connect acknowledgement message in response to receipt of the connect message; and (e) attempting to establish a data mode session between the telematics unit and call center. If desired, steps (a) through (c) can be repeated one or more times if the mobile originated call is not connected successfully, and as well the step of attempting to establish the data mode session can be retried iteratively if not initially successful.

In accordance with another aspect of the invention, there is provided a cellular voice channel origination method which comprises the steps of: (a) initializing a counter; (b) starting a connection timer; (c) attempting a radio resource connection from a vehicle telematics unit to a wireless cellular system; (d) sending a service request via a standalone dedicated control channel of the wireless cellular system; (e) initiating a mobile originated call to a call center via the wireless cellular system; (f) monitoring at the telematics unit for receipt of a connect message over a fast associated control channel of the wireless cellular system; (g) incrementing the counter if the connect message is not received before expiration of the timer and then repeating steps (b) through (f) after incrementing the counter; (h) sending a connect acknowledgement message if the connect message is received; (i) attempting to establish a data mode session between the telematics unit and call center; (j) repeating at least steps (b) through (f) until the data mode session is successfully established or the counter reaches a specified maximum limit.

BRIEF DESCRIPTION OF THE DRAWINGS

One or more preferred exemplary embodiments of the invention will hereinafter be described in conjunction with the appended drawings, wherein like designations denote like elements, and wherein:

FIG. 3 is a call connection table identifying different call types and containing call parameters used by the method of FIG. 2 to determine what type of call to establish with the call center;

FIG. 12 is a flowchart of a voice fallback origination method that can be used to establish a voice channel cellular connection with the call center.

DETAILED DESCRIPTION OF THE PREFERRED EMBODIMENT(S)

The system and methods described below can be used by a vehicle telematics unit to establish a vehicle originated voice and/or data connection with a call center in response to some initiating input received by the telematics unit. Although the methods described below are such as they might be implemented for a 2G GSM (GPRS and EDGE) system, it will be appreciated that they could be useful in 3G UTMS (W-CDMA, HSPA) and other types of cellular systems.

Communications System

Figure 1:
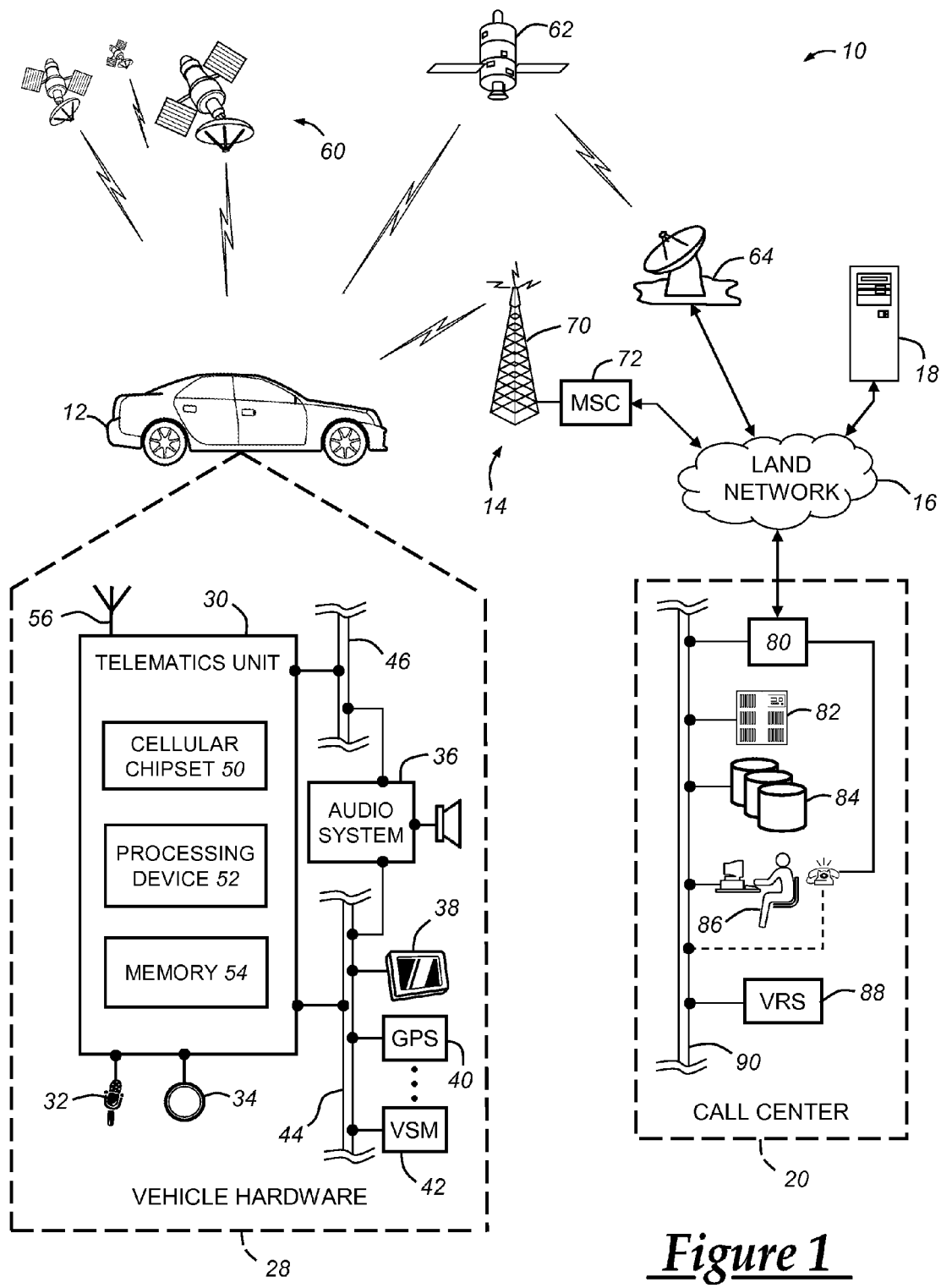
FIG. 1 is a block diagram depicting an exemplary embodiment of a communications system that is capable of utilizing the method disclosed herein.

With reference to FIG. 1, there is shown an exemplary operating environment that comprises a mobile vehicle communications system 10 and that can be used to implement the methods disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

The vehicle telematics unit (VTU) 30 is an OEM-installed device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via short message service (SMS) or packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to GSM, W-CDMA, or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols used in the wireless industry such as 3gpp or 3gpp2. Wireless networking between the vehicle and other networked devices can also be carried out using telematics unit 30. For this purpose, telematics unit 30 can be configured to communicate wirelessly according to one or more protocols implemented per 3gpp or 3gpp2 standards and also other wireless protocols, such as any of the IEEE 802.11 protocols, WiMAX, or Bluetooth™. When used for packet-switched data communication such as TCP/IP, the telematics unit can be configured with a static IP address or can be set up to automatically receive a dynamically assigned IP address from another device on the network, such as from a router or from a network address server (e.g., a DHCP server).

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as 2G CDMA (IS-95), 3G CDMA2000 (IS-2000, 1XRTT, EVDO), 2G/2.5G GSM (GPRS, EDGE), or 3G W-CDMA (UMTS, HSPA). As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, a packet-switched data network (PSDN), and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. For example, computer 18 can be connected to one or more of the other system 10 components via a private or virtual private network (VPN) implemented through a leased line or Internet ISP in the PSDN. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless local network using protocols such as 802.11x and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Method

Figure 2:
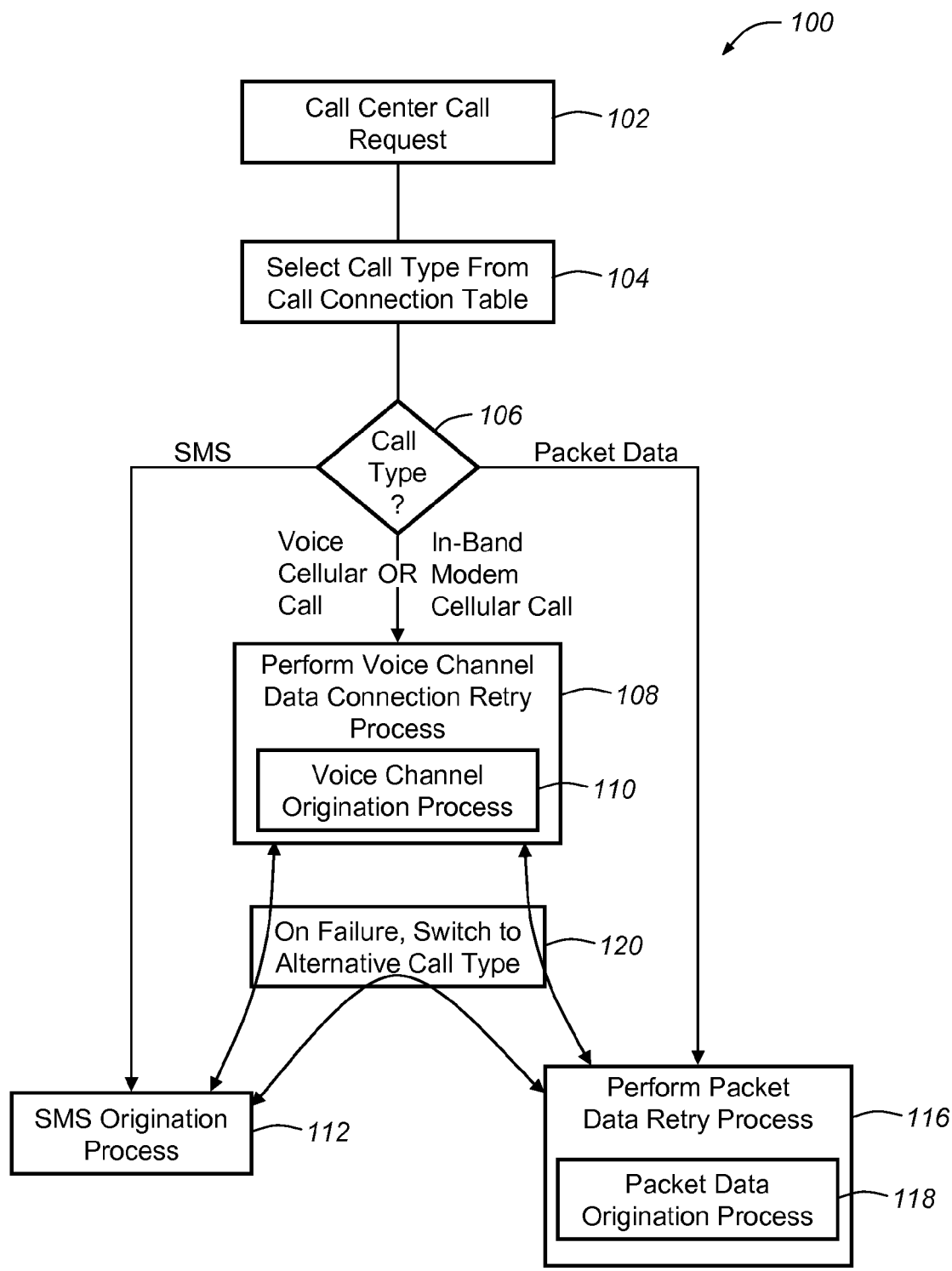
FIG. 2 is a flowchart depicting an overview of one embodiment of a communications method that can be used by a vehicle telematics unit such as in FIG. 1 to establish a voice or data connection with a call center in response to an input requesting the connection.

Turning now to FIG. 2, there is shown the overall connection strategy 100 for making vehicle originated calls from the telematics unit 30 to the call center 20. The method of FIG. 2 as well as that of the other figures can be carried out using suitable programming of the vehicle telematics unit (VTU) as well as using suitable hardware and programming of the other components shown in FIG. 1. These features of any particular implementation will be known to those skilled in the art based on the above system description and the discussion of the various methods that are described below in conjunction with the remaining figures. Further, as noted above, although any of a variety of different wireless communication technologies can be used, the following discussion is directed most specifically to the use of 2G/2.5G GSM (GPRS and EDGE) and also indirectly as part of the network parameters, air interface and channel scheme for 3G W-CDMA (UMTS and HSPA).

The method of FIG. 2 begins with the step 102 of obtaining a request to connect to the call center 20. This request is in some form of an input received or otherwise obtained by the telematics unit 30, and the input is associated with a desired wireless communication of data or other message via either a voice communication (speech) or data connection from the vehicle 12 to a call center 20. This initiating input can be received from the vehicle LAN (e.g., via bus 44) or from the vehicle user interface, or from some other source. For example, the input can be a manual input by the vehicle driver or other occupant, such as a button press or voice command to indicate that a call to the call center is desired. Or, the input can be generated automatically, such as by a sensor or controller in response to sensor input. An airbag deployment signal, such as is generated by a crash sensor, is one known example of sensor input that automatically initiates a data connection to the call center. Another type of input is a trigger that can be set on the vehicle, such as a software trigger in the telematics unit 30 or elsewhere that, when the trigger occurs, initiates the connection to the call center. Yet another input is as a response to a received wireless communication from the call center or elsewhere, whether via cellular telephony, satellite broadcast, or otherwise. In this latter scenario, the telematics unit 30 can initiate the call center call to respond to the earlier received communication, such as to acknowledge receipt or performance of some action on the vehicle, or to supply information such as DTCs or other vehicle data.

Depending on the reason for the call center call, one of a number of different types of potential connections will be used for communication of the data or other message back to the call center 20. Thus, the next step 104 is to select a call type associated with the desired wireless communication back. This selected call type identifies the type of connection being attempted between the VTU and call center; for example, a voice cellular call (i.e., speech conducted over a cellular voice channel), an in-band modem cellular call (i.e., a modem data connection established over a cellular voice channel), or a non-voice channel (NVC) data connection such as SMS or a packet data connection (e.g., TCP/IP using GPRS or EDGE). Thus, as one example, for communication of speech, a voice cellular call can be used, whereas for the communication of data, either an in-band modem cellular call or a NVC data connection can be used. Other call types can be used as well. For example, speech can be communicated using a data connection wherein the speech is digitized and sent over, for example, a packet data connection.

Selection of the call type can be carried out based on one or more call parameters, such as the content of the desired wireless communication (e.g., an emergency call versus a request for navigation assistance versus an automatic upload of DTCs or other vehicle data), the source of the requesting input for the communication (e.g., manual button press by an occupant versus an automatic input based on a sensor reading versus a call received from the call center), or the intended recipient (e.g., server 82 versus advisor 86 versus VRS 88). In at least some instances, the selected call type can be a preferred call type with an alternative call type being specified as a backup. If at some point during the process of FIG. 2, the VTU 30 determines that one or more origination attempts using the preferred call type has failed, then the alternative call type can be used to access and carry out an alternative connection strategy. This is shown at block 120. In addition to or in lieu of the use of an alternative connection strategy, a separate retry track can be specified to identify a desired level of persistence in attempting origination. This is discussed in more detail below.

FIG. 3 depicts a call connection table that contains the various call parameters which relate to different types of communications and which are useful in selecting a desired call type. Each row of the table represents a different type of message, or communication, to be sent to the call center 20. Selection of the call type to be used for communication of the message can be selected based on a message category or, as noted above, can be based on one or more other factors such as the type or source of initiating input. The message category shown is a broad classification of the content of the communication itself. If desired, one or more other levels of abstraction of the message content can be identified and used either for selection of call type or for reporting back to the call center or taking other action. For example, in the illustrated call connection table, there is also provided a message type, which is a finer classification of the message content into a calling code associated with the message contents. This calling code can be sent to the call center at the establishment of the connection and used for various purposes, such as to identify what vehicle data is being uploaded to the call center or how the call or uploaded data should be processed within the call center. The various call parameters shown in FIG. 3 are representative of the different messages and initiating inputs involved in initiating calls to the call center; however, it will be appreciated that many other additional types could also be used.

As indicated in FIG. 3, for each type of desired wireless communication, there is a preferred call type which, in the illustrated embodiment, is either a voice cellular call (VCC), an in-band modem cellular call (IMCC), a packet data connection, or an SMS (either binary or text-based messaging). Also, in some instances, an alternative call type is identified, such as in the case of certain preferred packet data call types where an IMCC connection attempt can be used as an alternative connection strategy if the packet data connection fails. The retry track identifies a persistence level that is useful in attempting originations of voice channel cellular connections so that, for higher priority communications, the VTU will carry out an additional, comprehensive connection strategy in the event that other origination attempts fail.

Referring back to FIG. 2, once the call type is selected at step 104, then the process branches based on the selected call type, step 106, and carries out an appropriate connection strategy associated with the selected call type. For a voice cellular call, which is meant to be used by an occupant for communicating with the call center advisor or voice response system (VRS) via speech, a voice-only cellular call can be established wherein only speech is exchanged with the call center via the cellular system's voice channel. However, in the embodiment of FIG. 2, where the call type is either the voice channel call or the in-band modem cellular call, the method moves to block 108 where a voice channel cellular call is established using a voice channel data connection retry strategy. This approach is done even for voice cellular calls so that useful vehicle data can be uploaded to the call center for use by the advisor or VRS prior to the start of speech. The connection retry strategy used to establish the voice channel cellular call involves a plurality of different connection methods that are attempted serially until either one of the methods results in a successful origination, or all fail. In general, the methods each involve attempting to attach to a cellular base station, originating a voice channel cellular connection via the attached base station, and then establishing a modem data connection with the call center over the originated connection. As used herein, an "attached base station" is, for GSM systems, a base station for which the VTU is camped on, is receiving a decodable broadcast control channel (BCCH), and is registered. For CDMA, an "attached base station" is one on which VTU is registered. Thus, using an attached base station, the step 108 will carry out a voice channel origination process 110 during which the telematics unit attempts origination of the voice channel cellular connection and, if the connection is made, it will then establish the modem data connection to upload the desired data. The voice channel data connection retry process and its different connection methods are discussed in greater detail below in connection with FIGS. 4-7 and the voice channel origination process can be carried out according to FIG. 8 or otherwise in a manner known to those skilled in the art.

For a NVC data connection call type, the process of FIG. 2 uses a connection strategy that attempts to establish either a packet data connection or an SMS data connection, and the selection between these two types of data connections can be made in any desired manner, such as by using the call connection table of FIG. 3. Where an SMS data connection is desired, the process moves from step 106 to 112 where it carries out an SMS origination process 112 to establish an SMS data connection. This SMS origination can be done in a known manner or as described below in connection with FIG. 9. If successful, then the desired wireless communication can be transmitted to the call center in the form of a text message. The SMS message can be sent using known techniques or as discussed below in connection with FIG. 10. And, where a packet data connection is desired, the process instead moves from step 106 to 116 where it carries out a packet data retry process that attempts a packet data origination 118 to establish the packet data connection. If successful, then the desired wireless communication is transmitted as packetized digital data from the vehicle to the call center. The packet data retry process 116 and its origination process 118 can be carried out in a manner known to those skilled in the art, or as described further below in connection with FIG. 11.

Where communication with the call center via the preferred call type is not available, the process can permit an attempted connection via one of the other call types as an alternative connection strategy, as indicated at block 120. The determination as to whether one or more alternative strategies should be used can be carried out in various ways, such as by using the call connection table of FIG. 3 to specify for each message type or each call type what alternative, if any, is available.

Once a suitable connection is established between the VTU 30 and call center 20, the desired wireless communication of speech and/or data is sent via that connection. The process of FIG. 2 then ends.

Figure 4:
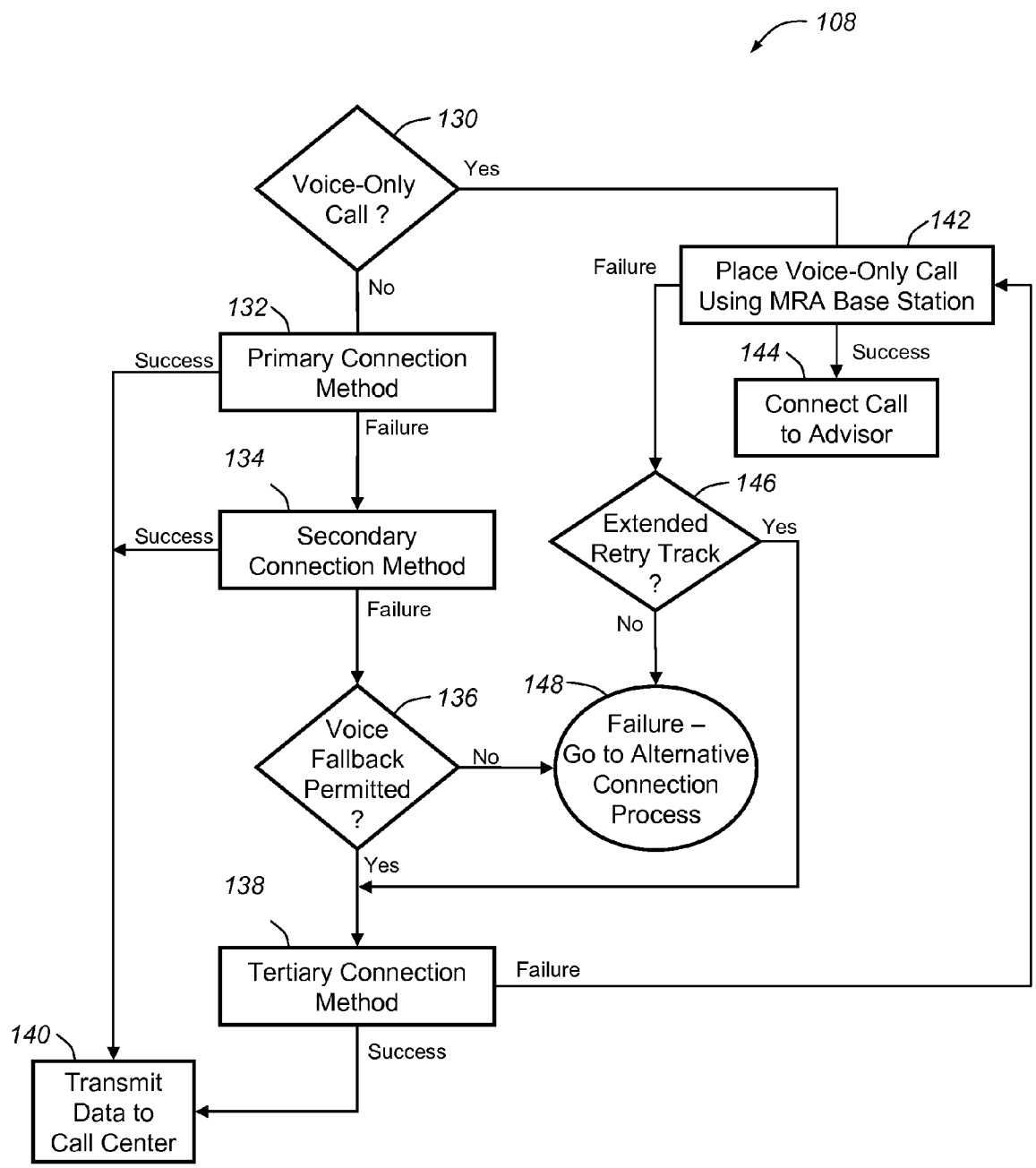
FIG. 4 is a flowchart showing one embodiment of a voice channel retry method for use by a vehicle telematics unit in establishing a voice channel cellular connection with a call center.

FIG. 4 depicts the voice channel data connection retry process 108 in greater detail. In the illustrated embodiment, this process is used for originating both voice-only calls (speech only) as well as in-band modem cellular calls (IM-CCs), although it will be appreciated that, if desired, the process could be used to establish other types of vehicle originated calls, such as packet data connections and SMS transmissions. The first step is to determine at block 130 which of these two call types is being attempted. In most instances, it is desirable even for calls meant primarily to conduct speech between a vehicle occupant and call center that an IMCC be established during the first few seconds of the call to upload vehicle data, as noted above. For these calls, the process moves to step 132 to carry out a primary connection attempt in which origination of the IMCC is attempted using either a currently-attached base station or one that can be attached to via an idle mode process that involves cell reselection and attempting to attach to a base station following cell reselection. The primary connection method 132 is further described farther below in connection with FIG. 5.

The idle mode process can be implemented using standard GSM procedures. In one implementation, the idle mode process can be carried out using the C2 reselection algorithm, as is known to those skilled in the art. Apart from only cell reselection, the GSM idle mode process can perform a more complete search for an available base station. For example, the idle mode process used can perform the following procedures: (1) PLMN section and reselection; (2) Cell selection (C1) and reselection (C2); and (3) location registration. These procedures are known to those skilled in the art. For example, PLMN selection can be carried out per TS23.122, cell selection/reselection can be carried out per TS43.022/TS45.008, and location registration for IMSI Attach/Detach can be carried out per TS23.122/TS23.012. As will be known by those skilled in the art, in implementing the idle mode process, the search for a PLMN can be limited to the access technology or access technologies associated with the PLMN in the appropriate PLMN Selector with Access Technology List (User Controlled or Operator Controlled selector list), as long as the specified Access Technology is also specified in the HPLMN Selector.

If the vehicle telematics unit is successfully attached to a base station per the primary connection method 132, then it carries out the voice channel origination process 110 of FIG. 2 which establishes the desired modem data connection with the call center, and the process then moves to step 140 where it transmits vehicle data to the call center over the established connection. The process then ends. If the primary connection attempt fails, then the retry strategy involves a secondary connection attempt 134 referred to herein as the MRA (most recently attached) connection process. In general, the MRA connection process 134 involves selecting a PLMN or other wireless carrier system recently used in placing a previous call, carrying out a cell selection process using the selected carrier system, attaching to a selected base station, and originating the IMCC to the call center via the attached base station. If this does not work, then the method further comprises repeating the carrier system selection, cell selection, and attaching steps using other previously used carrier systems until either a successful origination is made or until origination via a base station has been unsuccessfully attempted on all selected wireless carrier systems. This can be done using a list of the previously used PLMNs or other carrier systems that is maintained at the vehicle and that is updated each time a new call is originated. The secondary connection method 134 is further described farther below in connection with FIG. 6.

As with the primary connection method, if this secondary connection attempt is successful, then the voice channel cellular connection is originated and the modem data connection set up as indicated at step 110 of FIG. 2. If the secondary connection attempt fails, the process moves to step 136 where a check is made to determine whether the call being placed is permitted to revert to a voice-only call if the modem data connection cannot be established (voice fallback)—for example, because of an outage of an in-band data modem bank in the call center or a malfunction of the in-band modem in the VTU 30. In general, most voice calls are permitted to switch to voice fallback since the desired communication is speech, whereas non-voice calls are not. This can be specified in the call connection table of FIG. 3. Examples of speech-based calls for which voice fallback is desired include emergency and collision detection calls, roadside assistance calls, and telematics services enrollment calls from the vehicle. In each case, live speech with the occupant is desired and so the establishment of a voice-only call still enables the desired communication to be carried out. Examples for which no voice fallback is desired can include automated data upload, downloading of navigation routes to the vehicle, and notification to the call center of a vehicle theft using an on-board theft detection system. As will be appreciated, some or all of these latter types of data communication calls may not even involve interaction with an occupant so there may be no benefit in providing a voice-only connection in the event that a data connection cannot be established.

If voice fallback is not permitted for the call being placed, then the process 108 is considered to have failed, as indicated at block 148. In this case, if the call connection table specifies an alternative call type for the call being placed, then the alternative connection strategy can be carried out, as indicated by block 120 of FIG. 2. If voice fallback is permitted, then the process moves to block 138 where a tertiary connection attempt is made. In general, this tertiary attempt implements a comprehensive connection strategy that includes attempting reselection of one or more PLMNs using a manual network selection mode supported by the GSM cellular system. If a reselected PLMN is successfully obtained, then the telematics unit attempts to attach to a base station within the reselected PLMN and, if successful, it then proceeds to originate the IMCC call and establish the modem data connection. The process then moves to block 140 where the desired data is transmitted to the call center and the call then switched to voice mode, if desired.

If the tertiary connection attempt fails, then the process goes into voice fallback in which it attempts to originate a voice-only call by setting up a voice channel cellular connection without establishing a modem data connection. This is the same process as is used for establishing a voice-only call where it was determined at block 130 that no data connection was needed. Thus, for voice-only calls, the method attempts to establish a voice channel cellular connection for communication of speech without using the primary, second, or tertiary connection attempts; whereas, for IMCC calls that are permitted voice fallback, attempted establishment of a voice channel cellular connection occurs only if primary, secondary, and tertiary connection attempts fail. In either circumstance, the process moves to block 142 where the telematics unit places a voice-only call. In the illustrated embodiment, this is done using the most recently attached PLMN which can be looked up from the list noted above that is used in the MRA connection process 134 and maintained at the vehicle. Additional attempts can be made to acquire a suitable base station if the latest registered PLMN (RPLMN) is not found. For example, acquisition of each of the PLMNs in the latest RPLMN's BCCH Allocation list (BA list) can be attempted and, if none found, then the telematics unit can go through a full acquisition process similar to that upon done by wireless GSM cellular devices upon power on. As will be understood by those skilled in the art, to place the voice-only call, the telematics unit can use Teleservice ID 11 (GSM speech teleservice for the regular telephone service) per TS23.018 Basic Call Handling using a specified voice fallback number.

Although the voice-only calls are established on the basis that a modem data connection is not needed or not available, if the call attempted at bock 142 is successful, then if desired, call center can nonetheless attempt to establish a modem data connection (e.g., by sending a suitable signaling tone the telematics unit), in which case the telematics unit can be configured to respond to this and switch to data mode for an initial vehicle data upload. Once done, the call can be switched to voice mode for communication with the vehicle occupant. Regardless of whether an initial data mode connection is attempted, after the call is successfully established, the process moves from step 142 to step 144 where the call is connected at the call center to an advisor to supply assistance to the vehicle occupant.

If the voice-only call attempt fails, then the process moves to block 146 where a check is made to determine if the particular call being placed is of the type that has a specified extended track. This can be done using the call connection table of FIG. 3. If an extended track is specified, such as for a collision or emergency call, then the process returns to retry the comprehensive connection approach 138. Thus, for more important calls, the system continues to re-attempt a connection until successful or, if desired, a maximum number of retries is attempted. If no extended track is specified, then the connection retry process 108 is considered to have failed, as indicated at block 148.

Figure 5:
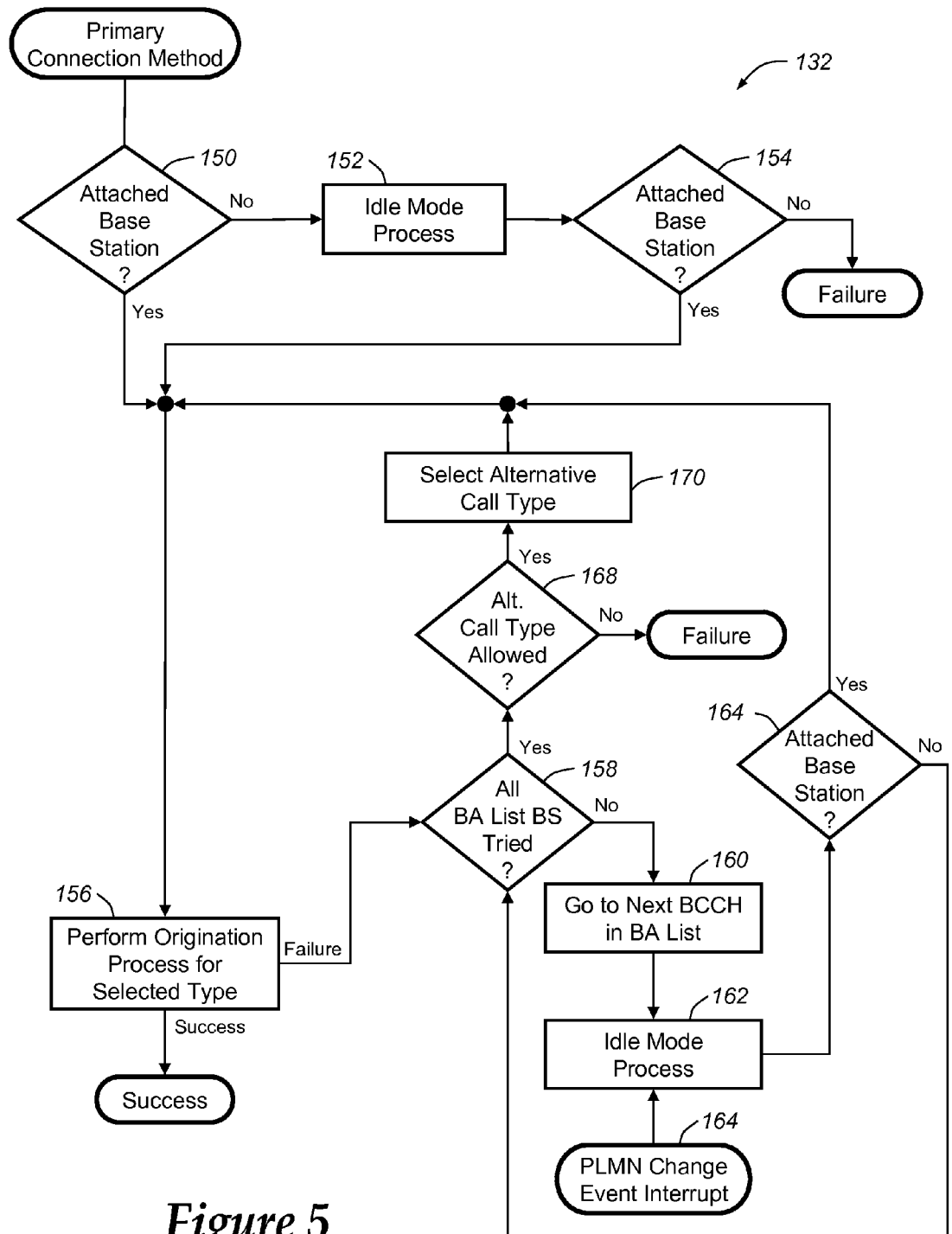
FIG. 5 is a flowchart of a primary connection attempt method used in the voice channel retry method of FIG. 4.

Turning now to FIG. 5, there is shown further details of the primary connection strategy 132 of FIG. 4. In general, the method involves verifying that the telematics unit is attached to a base station, attempting to originate a connection with the call center using the attached base station and, if that fails, then iteratively attempting to attach and connect via neighboring base stations identified by a BA list obtained from the attached base station. The method begins at step 150 where a check is made to determine if there is a currently-attached base station, such as one to which the telematics unit was already attached to prior to receiving the request to connect to the call center. If so, the process can proceed to attempt origination at step 156. If not, then the telematics unit executes an idle mode process 152 which can be the same or different than that discussed above in connection with FIG. 4. At step 154 it is determined whether the idle mode process resulted in attaching to a reselected base station. If not, then the primary connection attempt is considered a failure. As discussed above, when used as a part of the FIG. 4 data connection retry method 108, failure of this primary connection attempt is followed by a secondary connection process. Although the checks for determining if the telematics unit has successfully attached to a base station are shown in FIG. 5 and other figures as discreet steps, it will be appreciated that if, after initial determining that there is not an attached base station (e.g., no decodable BCCH) and during the process the BCCH subsequently becomes decodable, the telematics unit can continue on with the connection process.

If at block 154 it is determined that the telematics unit successfully attached to a reselected base station, then the process continues to block 156 where an origination process is carried out to establish the voice channel cellular connection via the attached base station. If successful, the method ends and the telematics unit and call center can proceed to establish a modem data connection. If the origination attempt fails, then the process moves to block 158 where an iterative process begins in which the BA list received from the attached base station is used to attempt attachment to neighboring base stations that are on the list. Thus, assuming not all base stations on the list have yet been tried, the process goes to step 160 where the next base station on the list is identified and attachment attempted using the BCCH identified for that next base station. For this purpose the telematics unit receives and decodes base station information via the BCCH and attempts to attach to a neighboring base station using the decoded information. This can be done via an idle mode process, as indicated at step 162. The idle mode process can also be used in the event a PLMN Change Event Interrupt 164 occurs anytime during the primary connection attempt process. If an interrupt 164 is received, the idle mode process can be used to carry out a PLMN reselection process and then attach to a base station following that reselection. For a reselected PLMN, the iterative process of FIG. 5 can be carried out until successful or all base stations identified from the BA list for the attached base station from the reselected PLMN have been tried.

From step 162 the process moves to step 166 where a check is made to determine if the telematics unit was able to attach to a base station. If so, then origination is attempted with that attached base station. If not, then the process loops back to step 158 to iteratively try the next base station on the BA list. Once all base stations on the active BA list have been tried, as determined at block 158, then the process can either return failed or, as shown, can check to determine at step 168 whether an alternative connection strategy exists. This can be identified from the alternative call type column of the call connection table of FIG. 3. For example, where a packet data connection is identified as a permissible alternative call type, then the process can switch to the packet data retry process 116. If none is available, then the secondary connection attempt fails; however, if an alternative connection strategy is available, then that strategy is carried out at step 170 with a call origination attempt 156 then being made.

Figure 6:
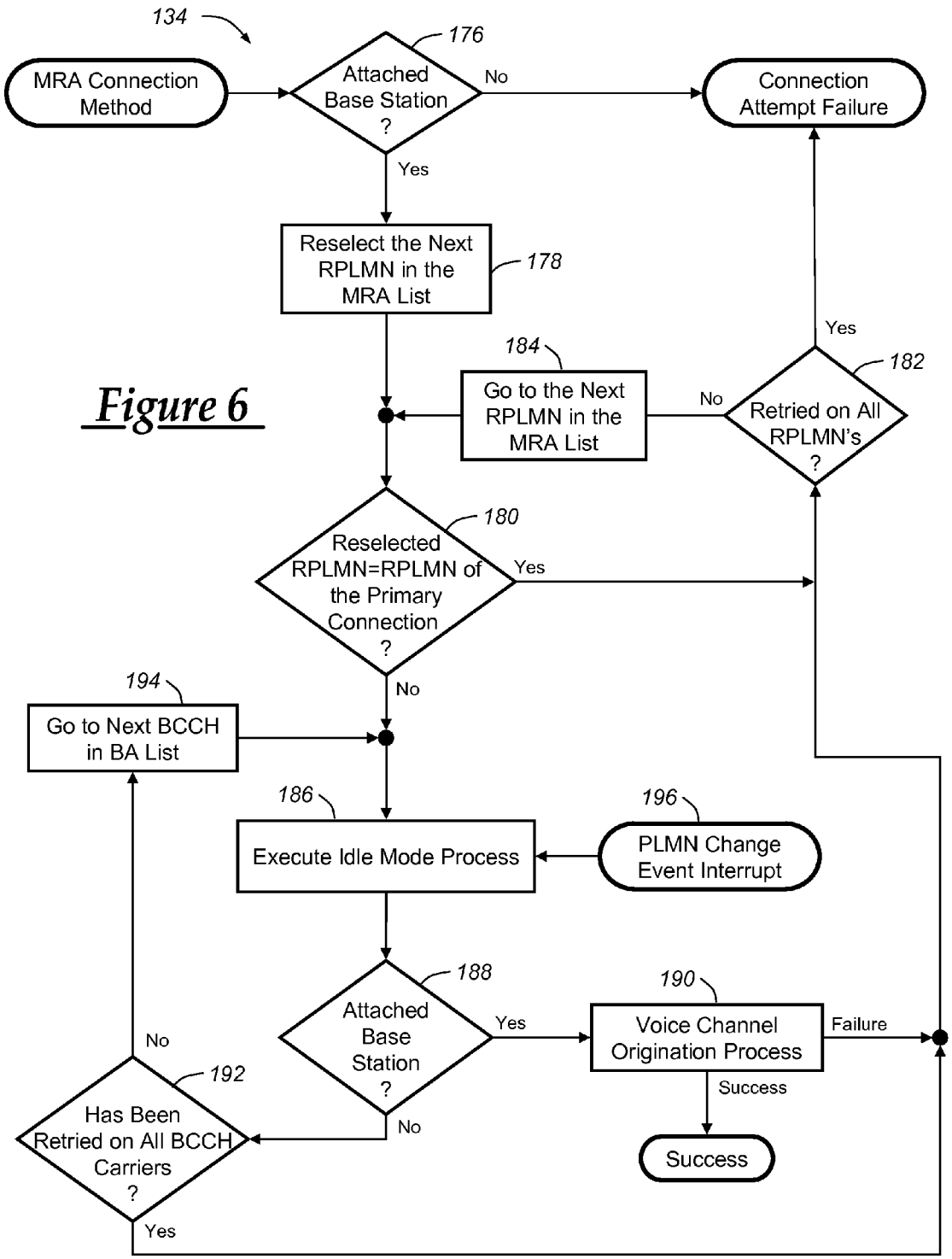
FIG. 6 is a flowchart of a secondary connection attempt method used in the retry method of FIG. 4.

FIG. 6 depicts the secondary connection method 134 which is a most recently attached (MRA) process used to attempt origination via one of the wireless carrier systems to which the telematics unit has recently successfully used. This process begins following failure of the primary connection method to successfully originate the IMCC call. In general, the MRA connection process 134 involves selecting a carrier system recently used in placing a previous call, carrying out a cell selection process using the selected carrier system, attaching to a selected base station, and originating the IMCC to the call center via the attached base station. For this purpose, a list of carrier systems is maintained at the vehicle, and this list is referred to herein as the MRA list. It includes the carrier systems that the telematics unit has previously registered with in reverse chronological order (i.e., with the most recently attached carrier system listed first). In 2G/2.5G GSM (GPRS and EDGE) and 3G W-CDMA (UMTS, HSPA) cellular systems, the wireless carrier systems are identified by PLMNs to which the cellular chipset 50 in the VTU 30 is attached by updating its location. Thus, in one embodiment, the list can be of those PLMNs for which the telematics unit has previously successfully completed an IMSI attach procedure. Given that the primary connection method has failed, the MRA connection process seeks to attach to a base station using recently registered PLMNs for which there can be assumed a reasonable likelihood of success within a particular geographic coverage area.

Initiation of the MRA connection process results when the system has detected or otherwise determined failure of the first connection attempt with the call center via an attached base station of a registered PLMN. In response to that determination, the process accesses the MRA list and carries out the iterative process described below. Typically, the telematics unit will come into the MRA connection process with an attached base station for the last PLMN used by primary connection method. This is confirmed by step 176 such that the MRA connection process will immediately terminate as failed if no such base station is attached. In other embodiments, the initially attached base station may not be required. Assuming the telematics unit is attached, the process moves to step 178 where the process accesses the MRA list of PLMNs and selects the next PLMN in the list. This can be the first entry in the MRA list or, where it is assumed that the first entry was one of the ones unsuccessfully used in the primary connection attempt, step 178 can be used to start out with the second entry in the MRA list. At step 180 a check is made to determine if the reselected PLMN is the same as that attempted during the primary connection method. If so, there is no need to attempt on that PLMN again, and the process can select the next entry in the MRA list at block 184 after first verifying at step 182 that there are still untried entries remaining in the list. The process then loops back to step 180 to again confirm that the currently-selected PLMN was not one used in the primary connection method.

Once a PLMN is selected, the process moves to step 186 where it executes an idle mode process that can be the same as those described above in connection with FIG. 4. If an attached base station is acquired, as indicated at step 188, then a voice channel origination 190 is attempted, and this can be the same as the origination process 110 identified in FIG. 2. If origination is successfully, then the telematics unit and call center can proceed to establish the modem data connection and communicate data as desired. If origination fails, then the process loops back up to block 182 to again check for more entries in the list. If the telematics unit does not attach to the selected base station resulting from step 186, then the process moves from block 188 to step 192 where a check is made to determine if all BCCH carriers (i.e., all neighboring base stations) have been tried. This can be done by obtaining the BCCH Allocation (BA) list for the base station selected in step 186, and then one by one attempting to attach to the neighboring base stations identified from the BA list. This involves scanning the BCCH carriers in the BA list received from the selected base station. Assuming there are untried nearby base stations, the process moves to step 194 where the next base station from the BA list is selected and the idle mode process is again executed for that next base station in an attempt to attach. Thus, it will be appreciated that the MRA connection process 134 involves iteratively going through the MRA list one PLMN at a time, selecting a base station for each PLMN using an idle mode process, attempting to attach to the selected base station and, if unsuccessful, attempting to attach to each of a number of neighboring base stations identified by the selected base station and, once an attached base station is acquired, attempting to originate the voice channel cellular connection via the attached base station. If origination fails on an Absolute Radio Frequency Channel Number (ARFCN) in the received BA list, the telematics unit can determine the next available ARFCN that corresponds to that PLMN entry to search for the next suitable cell. Upon failure of the origination process, the telematics unit can perform PLMN/cell reselection via the idle mode process on all BCCH ARFCNs in the received BA list of its corresponding PLMN entry in the MRA list.

As discussed above in connection with FIG. 5, the idle mode process can also be used in the event a PLMN Change Event Interrupt 196 occurs anytime during the secondary connection attempt process. If an interrupt 196 is received, the idle mode process 186 can be used to carry out a PLMN reselection process and then attach to a base station following that reselection. For a reselected PLMN, the iterative process of FIG. 6 can be carried out until successful or all base stations identified from the BA list for the attached base station from the reselected PLMN have been tried. The overall process can then either restart or continue with PLMNs from the MRA list. For example, when a PLMN Change Event 196 occurs during the MRA connection process 134, and the telematics unit is unable to camp on a new PLMN and its associated BA list, the telematics unit can check to determine if it has retried on all PLMN entries in the MRA list.

Although not shown in FIG. 6, at the successful conclusion of the MRA connection process where an origination has successfully occurred, the MRA list can be updated with the newly reselected RPLMN. As will be appreciated, the MRA list can be maintained at the vehicle by storing it in the telematics memory 54 or some other suitable location.

Figure 7:
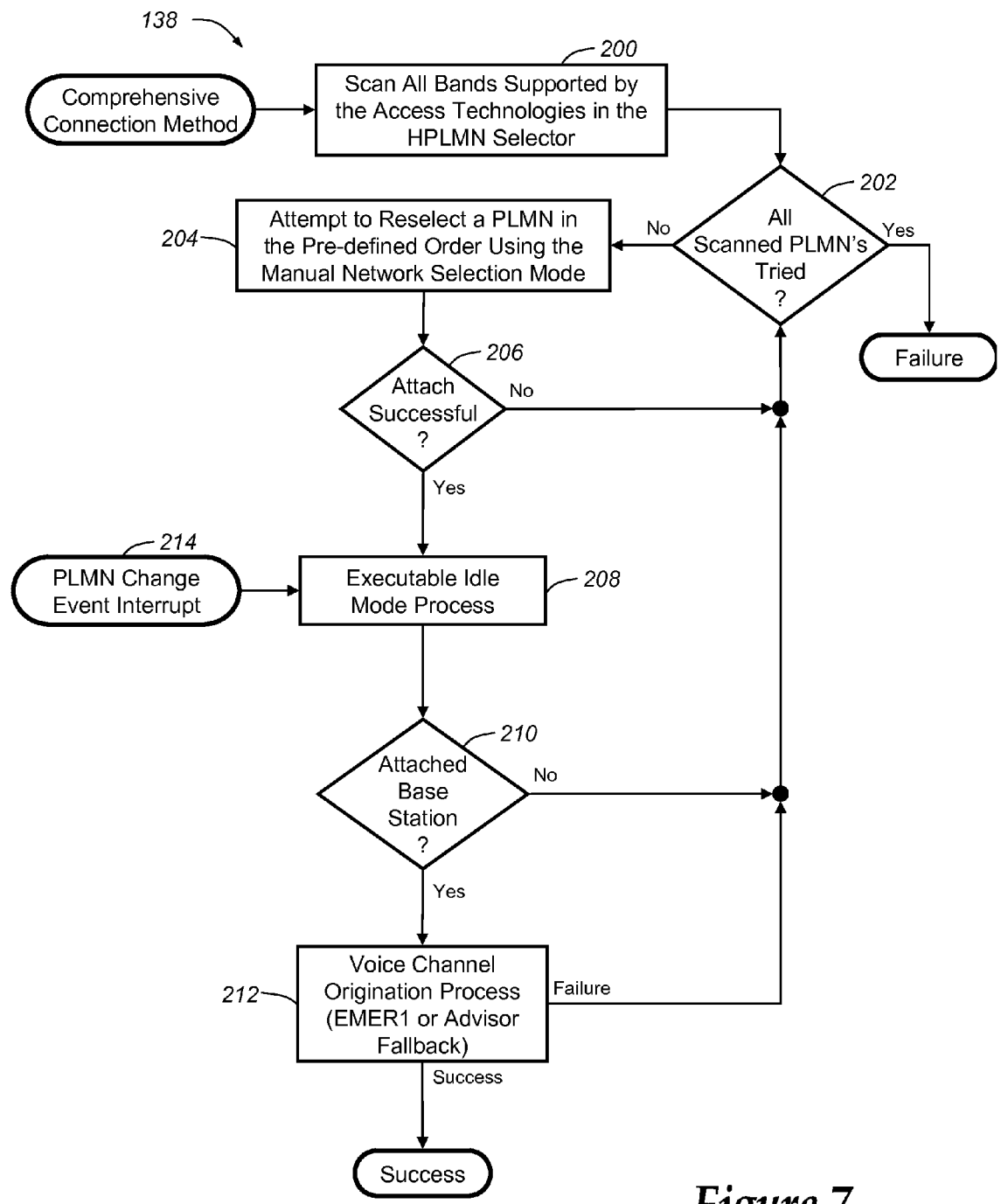
FIG. 7 is a flowchart of a tertiary connection attempt method used in the retry method of FIG. 4.

FIG. 7 shows the tertiary connection method 138 which is a comprehensive connection method utilized if the primary and secondary methods fail and the call type is one for which voice fallback is permitted. In general, the method involves using a supported manual network selection mode to attempt origination over any available wireless carrier system, and preferably this is done using a pre-established order of priority of carrier systems so that, for example, PLMNs most likely to be successfully attached to are attempted first. The method starts at step 200 where the telematics unit scans all band supported by the access technologies in the home PLMN (HPLMN) selector. As will be appreciated by those skilled in the art, for a GSM telematics unit, the SIM card contains a HPLMN selector that identifies the access technologies available for use by the telematics unit. This includes all of the GSM bands for the full ARFCN scanning. Once all available PLMNs have been found, the process moves through a loop control block 202 to step 204 where it attempts to reselect a PLMN according to a predefined order using the manual network selection mode supported by the GSM specification used by the PLMNs. In one embodiment, the order can be as follows:

1) the latest PLMN in the MRA list;
2) the HPLMN (home PLMN associated with the telematics unit);
3) a PLMN on the user controlled or operator controlled selector list (EFPLMNwAcT/EFOPLMNwAcT) in prioritized order;
4) other PLMN not in any list; and
5) a PLMN in a forbidden PLMN list or forbidden location area identity (LAI) list if no other PLMN is found by the telematics unit.

Given a selected PLMN using the process above, the telematics unit attempts to attach or otherwise access the selected PLMN and, if not successful at block 206, loops back up to determine at step 202 if there are any remaining PLMNs to try and, if so selects the next PLMN according to the pre-established order. If the PLMN is able to be accessed, then an idle mode process is used to attempt cell selection and attachment to the selected base station, as described above. This is done at step 210. Assuming the telematics unit attaches to the selected base station, then origination of a voice channel cellular connection is attempted at step 212 and this can be maintained as a voice-only call or a modem data connection (IMCC call) can be attempted if desired. Although not shown, the tertiary connection process can include attempted attachment to neighboring base stations using a BA list if the telematics unit is unable to attach to the selected base station for the selected PLMN.

As discussed above in connection with FIGS. 5 and 6, the idle mode process can also be used in the event a PLMN Change Event Interrupt 214 occurs anytime during the tertiary connection attempt process. If an interrupt 214 is received, the idle mode process 208 can be used to carry out a PLMN reselection process and then attach to a base station following that reselection. For a reselected PLMN, the iterative process of FIG. 7 can be carried out until successful or all base stations identified from the BA list for the attached base station from the reselected PLMN have been tried. The overall process can then either restart or continue with PLMNs identified at the start of the process.

Figure 8A:
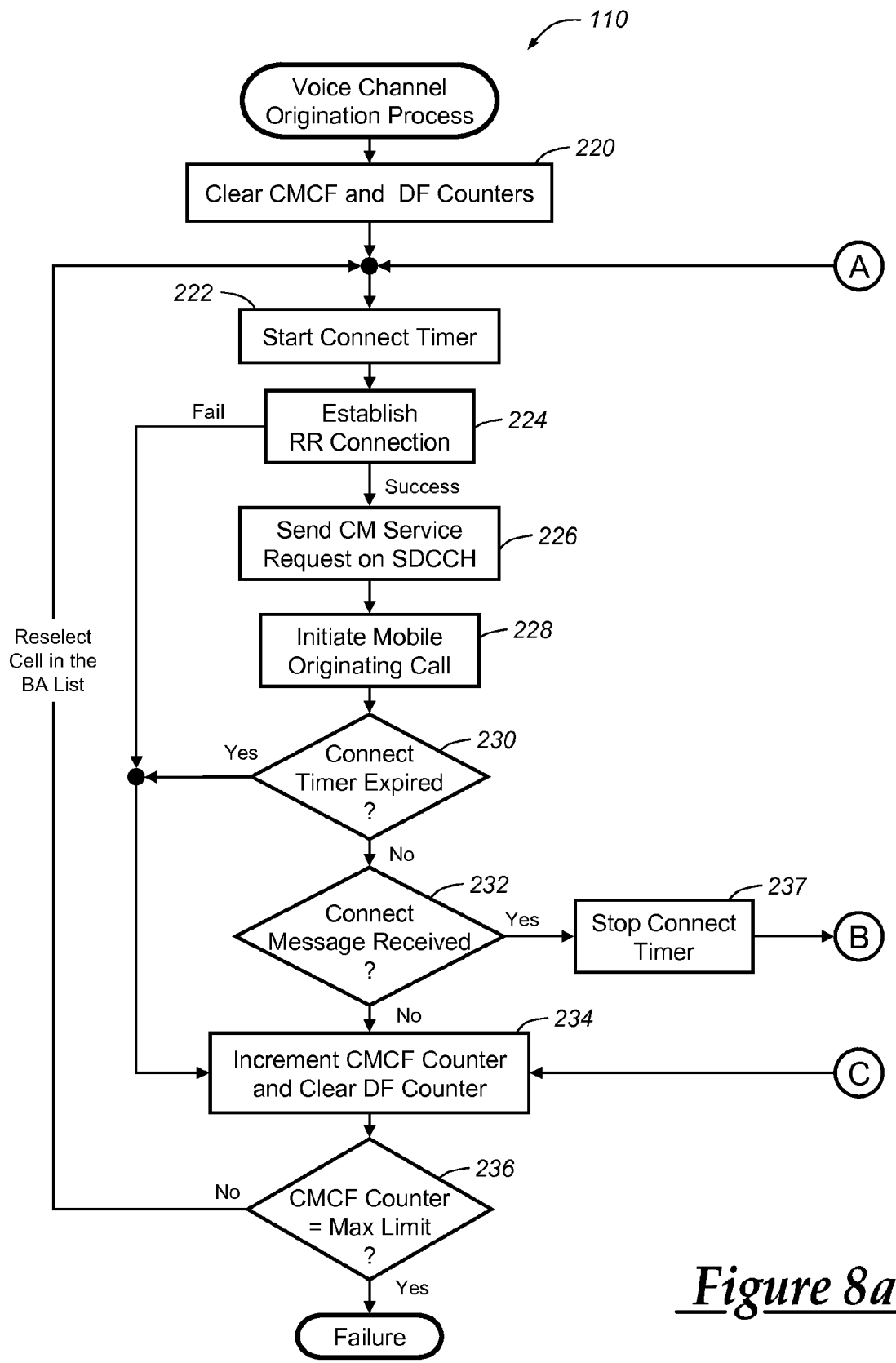
FIGS. 8a and 8b together comprise FIG. 8 which is a flowchart of a cellular voice channel origination method that can be used to establish a data mode session between the vehicle telematics unit and call center.
Figure 8B:
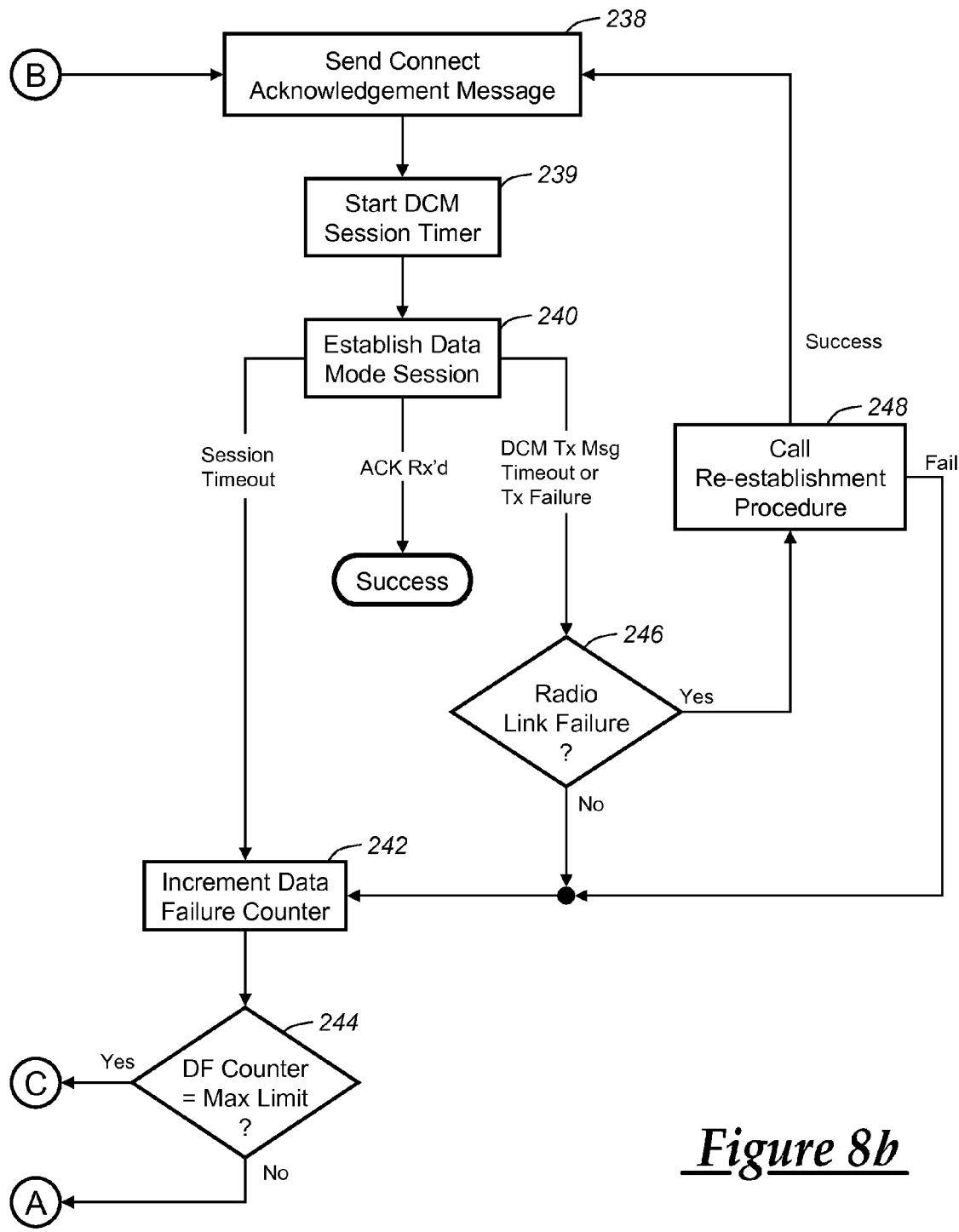

Turning now to FIG. 8, there is shown one method for cellular voice channel origination of a data mode session, such as is shown in block 110 of FIG. 2. The method begins once the VTU has an attached base station which can be done per one of the connection methods described above. The method uses a pair of counters, a CM_Connect_Failure (CMCF) counter and Data_Failure (DF) counter. The CMCF counter is an outer loop counter that is used for connection management (CM) to permit repeated attempts at origination while tracking how many times the origination attempt fails. The inner loop DF counter comes into play only once the call is originated and is used to track failures of the VTU and/or call center to then establish a data mode session between the two. Initially, these two counters are cleared to zero, as indicated at block 220. The VTU can specify full rate transmission by the vocoder using a Feature ID to set the Feature State of Codec, and this can be done in the CM Layer3 SETUP messages for the "Speech Version Indication" setting on a GSM vocoder.

In addition to the counters, a connect timer is used to provide a timeout that limits the amount of time available to establish the mobile originated call from the VTU. This software timer is started at step 222 and can have any suitable timeout period; for example, it can be a configurable period between 1 and 100 seconds. Thereafter, the connection management procedure is begun, starting with the VTU attempting to establish a radio resource (RR) connection on the BCCH carrier frequency for the current PLMN using the base station identity code (BSIC). This is indicated at step 224. If this attempted radio resource connection is not successful, then the CMCF counter is incremented and checked against a predetermined specified maximum limit (e.g., 5), as shown in blocks 234 and 236, and the process of restarting the timer at step 222 and re-attempting the radio resource connection at block 224 is repeated. As will be known by those skilled in the art, in a GSM system the radio resource connection involves a channel request made by the VTU over a random access channel (RACH), followed by a channel assignment from the base station over the access grant channel (AGCH). This radio resource connection can be carried out as specified in TS 04.18 Section 3.3.

Assuming the radio resource connection is successfully established, the process moves to block 226 where a CM (Connection Management) service request message is sent over the standalone dedicated control channel of the wireless cellular system. This can be done using Teleservice ID 11 as described above. Thereafter, the process initiates the mobile originated call, which can be done per TS24.011 Section 5.2.1. This is shown at step 228. As will be known by those skilled in the art, the process of steps 226 and 228 can be carried out in a conventional fashion. For example, on a GSM system the process includes sending the service request message to the MSC to request access, followed by authentication of the VTU by the base station. Once authenticated, the base station commands the VTU to switch to cipher mode for encryption of further communication. A destination address (e.g., the MSIDSN of the call center) is then sent to the MSC with a routing response being sent back, followed by a traffic channel then being assigned by the base station. The traffic channel is established on the fast associated control channel (FACCH). If this voice channel origination occurs before the connect timer expires, step 230, then the process monitors the FACCH for receipt of a connect message that is sent from the MSC to the VTU, step 232. That is, if the connect timer expires at some point during this origination process (e.g., before the traffic channel is assigned or at any time before the connect message is received), then the origination attempt is considered to have failed and is repeated up until the specified maximum number of tries. If the connect message is received without the timer having first expired, then the process moves to a second phase in which the VTU and call center attempt to establish a data mode session, as will be described below. If not received, the process moves to block 234 where the DF counter is reset and the CMCF counter is incremented. Thus, this step 234 can be carried out if the attempted radio resource connection fails, the SDCCH is not established after a successful radio resource connection, or in response to expiration of the timer or any failure that occurs before the connect message is received on the FACCH. After step 234, the CMCF counter is checked against a CMCF limit, as indicated at step 236. If the limit has not yet been reached, the process flow moves back to repeat the origination attempt process. This repeated attempt can be made after reselection of cells in the BA list and, if desired, this cell reselection can be carried out each time the origination attempt is repeated. However, if the specified maximum limit has been reached, then the process determines that the origination attempt has failed and the process ends. For GSM systems, if the origination attempt results in a response other than the connect message, the VTU can then process the GSM specific cause values for call control per TS 04.08 Annex H.

Assuming that the origination succeeds and the connect message is received at step 232, the connect timer is stopped, step 237, and the process then moves to step 238 where a connect acknowledgement message is sent, followed by an attempt to establish a data mode session using an in-band modem cellular connection (IMCC) between the VTU and call center via data compatible modems (DCMs) at each end. For this, a DCM session timer is initialized and started at step 239. This timer provides a maximum period in which the VTU and call center have to successfully established the data connection. As with the other timers used by the VTU, this timer can be implemented in software using a hardcoded or configurable timeout period. With the starting of the DCM timer, the process also carries out a data mode session establishment process, as indicated at step 240. Known modem connection procedures can be used for this purpose and, as a part of establishing this data mode session, the VTU can send a vehicle ID (VID) that identifies the VTU and/or the vehicle, and thereafter waits for an acknowledgement signal indicative of a successful data connection. If the acknowledgement signal is received, the process ends successfully and data can then be exchanged between the VTU and call center. The call can also be switched to a voice mode for communication of speech between a vehicle occupant and call center advisor using techniques known to those skilled in the art.

Where there occurs either a session timeout, modem transmission timeout, or other transmission failure and no acknowledgement signal is received, the DF counter can be incremented and another attempt made to establish the data mode session. This can be iteratively done up to a specified maximum number of attempts, at which point the current origination attempt is considered failed and the CMCF counter is then incremented to reflect this. Block 242 is used to increment the DF counter following which a check is made at block 244 to determine if the maximum data failure limit has been reached. If so, then at step 234 the CMCF counter is incremented and the DF counter cleared for re-use during a subsequent origination attempt. For a modem transmission timeout or transmission failure, rather than moving directly to step 242 to increment the DF counter, the process can optionally first make a check at block 246 to determine whether a radio link failure has occurred. If so, then a call re-establishment process can be carried out to attempt reconnection with the base station on the traffic channel, as indicated at block 248. If successful, the process returns to block 238 to send another connect acknowledgement message and attempt to set up a data mode session with the call center. If not successful, then the DF counter is incremented at block 242. If, due to a session timeout or a modem transmission timeout or other failure where there has not been any radio link failure, the process flows to block 242 to increment the DF counter. Thus, it will be appreciated that the DF counter is used to track failures in establishing the data mode session when call origination is successful, whereas the CMCF counter tracks not only failed attempts at voice channel call origination, but also each time there is a repeated failure (in excess of the maximum limit) to establish a data mode session.

The re-establishment procedure of block 248 can be carried out per TS04.18 and TS05.08 Section 6.7.2, and the process can include a timer with a 20 second limit. If a radio link failure is determined to have occurred (step 246), such as by receiving a radio link timeout on the slow associated control channel (SACCH) on the assigned traffic channel, then the modem session timer can be stopped while waiting for the results of the call re-establishment procedure of step 248. Then, if the call is re-established, then the VTU can initiate (reset) the session timer again and wait for the data mode session to be established.

Figure 9A:
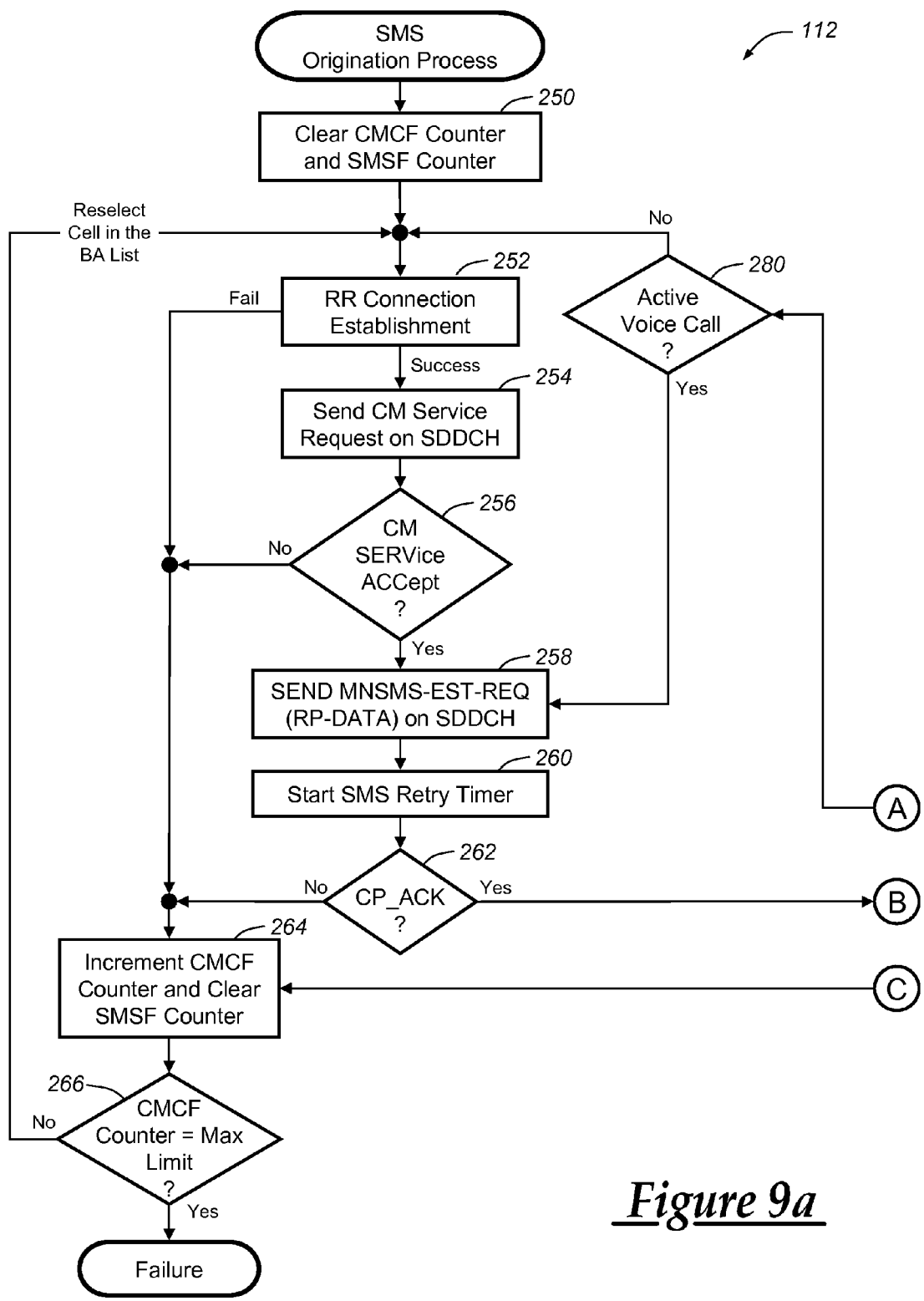
FIGS. 9a and 9b together comprise FIG. 9 which is a flowchart of an SMS origination method used for sending SMS messages from the vehicle telematics unit to the call center.
Figure 9B:
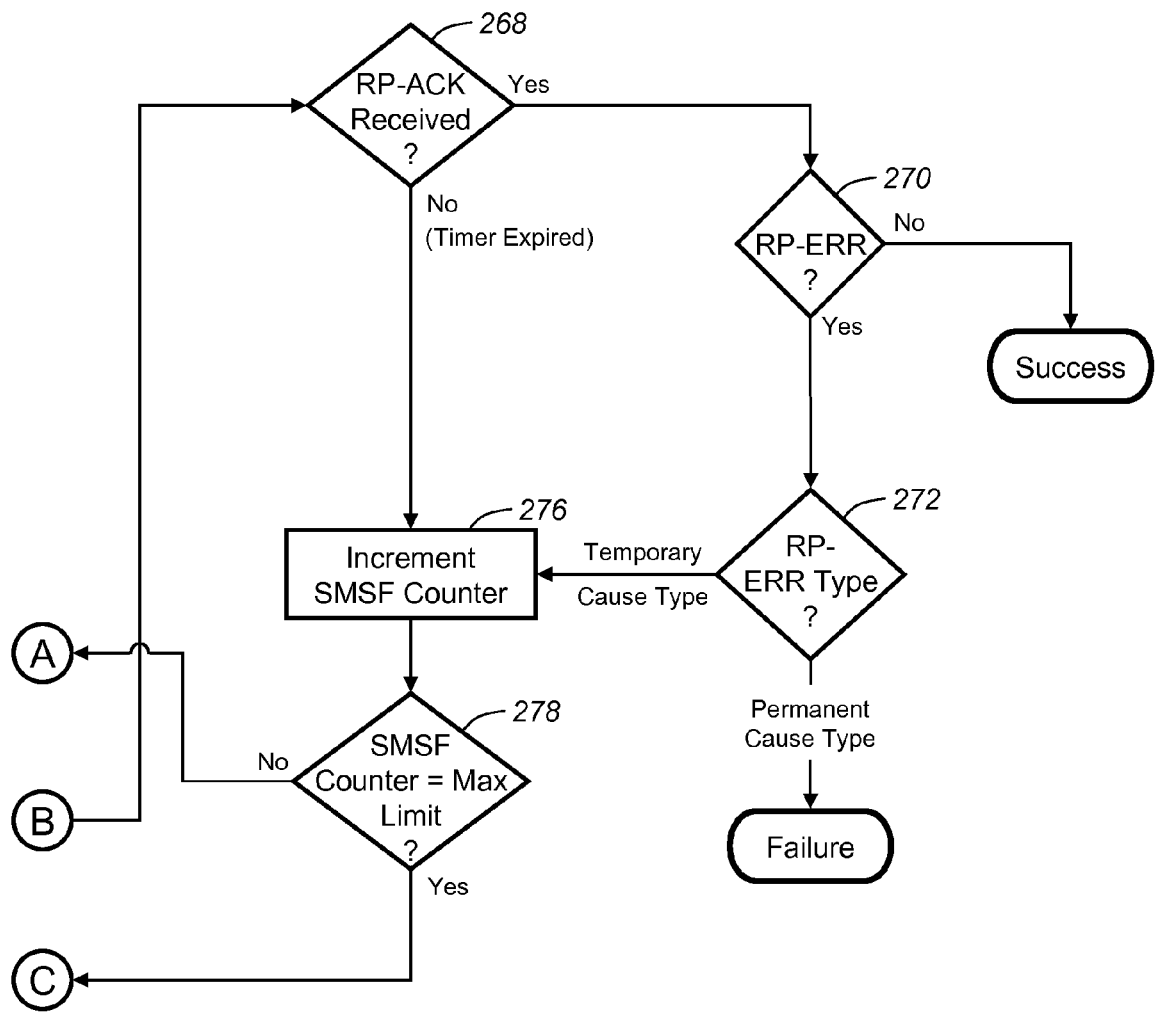

With reference now to FIG. 9, there is shown an SMS origination process such as can be used in step 112 of FIG. 2 to set up a NVC data connection. The SMS origination process has some similarities to that of the cellular voice channel origination process of FIG. 8, such as in its use of nested counters to track failures at different levels of the call setup. As described below, an outer loop counter is used to track the number of failed attempts to achieve call setup through the connection management phase, and an inner loop counter is used to count the number of failed attempts to transfer the SMS message to the short message service center (SMSC) via the establish radio link.

The process 112 starts following successful attachment to a base station, and this can be accomplished using known registration/attachment methods or as part of a connection retry strategy such as described above. First, at step 250 the process carries out an initialization of the two counters, CM_Connect_Failure (CMCF) and SMS_Failure (SMSF). This can be done by clearing these counters to zero. Then, the connection management iterative procedure begins which can be done in a similar manner to that described above in connection with FIG. 8. Thus, at step 252 a radio resource connection is attempted and, if this fails, the process moves to block 264 where the CMCF counter is incremented and then checked at step 266 to determine if it has reached a predetermined specified maximum limit. If so, the origination process ends with an indication that it failed. Subsequent attempts at SMS origination can then be carried out if desired, such as after a predetermined wait time or after a change in service availability is detected. If the radio resource connection is successfully made, then the process moves from block 252 to step 254 where a CM service request is sent over the SDCCH.

In this case the service type being requested is for a mobile originated SMS, and this can be carried out using Teleservice ID 22. Standard signaling between the VTU and the wireless network equipment (e.g., the base station and/or MSC) is carried out at this point, including authentication of the VTU by the base station. If service is granted, the VTU receives a CM service accept (CM_SERV_ACC) message. This is checked for at step 256 and, if not received, the process moves to step 264 to increment the CMCF counter. If the access request is granted, then the process moves to block 258 where mobility management (MM) connection establishment is carried out. This involves sending a MNSMS-EST-Req (RP-DATA) message over the SDCCH and associated signaling between the VTU and base station/MSC, and can be carried out according to the TS24.011 Section 5 CM procedures and Section 6 SM-RL procedures.

The process then moves to step 260 where a SMS retry timer is started. Although shown following the MNSMS-EST-Req message, this timer can be started at that time or otherwise as desired for a particular application. This timer provides a specified timeout within which the system has to provide the VTU with an acknowledgement that the relay protocol (RP) layer data message (RP-DATA) has been received by the network. Once the timer has started, the process moves to block 262 which looks for the CP-ACK message to confirm that the connection management call establishment has been successfully carried out. If not, the process moves to block 264 to increment the CMCF counter, which is then checked against the maximum limit and the process either stopped or returned to block 252 for another attempt. This repeating of the outer loop iterative process can be made after reselection of cells in the BA list and, if desired, this cell reselection can be carried out for each iteration of the process. Thus, the process increments the CMCF counter if any of the following occur: (1) the RACH/AGCH (radio resource) procedure fails; (2) SDCCH is not established after a successful RR connection; (3) the connection management service request is not granted (CM_SERV_ACC message is not received); or (4) the CP-ACK message is not received on the SDCCH. This outer loop iterative process is therefore used to setup and confirm a successful SMS connection from the VTU to the wireless network equipment at the base station/MSC.

Assuming that a connection has been successfully setup between the VTU and base station/MSC (as determined by the CP-ACK being received), the process then performs an inner loop iterative process as necessary to confirm successful transmission of the SMS message to the SMSC for pass through to the call center. The process therefore moves to block 268 to check to see if the RP-ACK is received before the SMS retry timer has expired. If a timeout occurs before receipt of this acknowledgement, then the process moves to block 276 to increment the SMSF counter. If instead, the RP-ACK is received before SMS retry timer expiration, then the process checks at block 270 for an RP-ERR message which, if received, is checked at block 272 to determine the error cause contained in the RP-ERR message. The error causes listed in TS024.011 Table 8.4 (part 3) are classified as permanent causes or temporary causes. If it is a permanent cause type, then the process terminates. For temporary causes, the SMSF counter is incremented at step 276. Each time the SMSF counter is incremented, it is checked at step 278 to see if it has reached a specified maximum limit that can be predetermined based on the number of retries desired. If the limit has not been reached, then the process moves to block 280 where a check is made to determine if an active call is in progress. This step can be used for GSM systems where there is an active voice call so that re-connection is not required. For example, if a voice call is in progress, the SMS message can still be sent, as this simultaneous communication is supported on most networks, but since a call is in progress, origination does not require the whole connection management procedure involving a new radio resource connection, etc. Thus, if there is an active voice call in progress, the process loops back to step 258 to resend the RPDU user information element over the established CM connection with the SMS retry timer being reset and restarted again at block 260. In this way, the process can resend the SMS message using the current channel assignment for the active voice call. Where there is no active voice call in progress, the process loops from block 280 back to step 252 to re-establish the connection and obtain a new channel assignment.

In the event that, at block 278, the SMSF counter has reached its maximum limit, this is treated as an overall connection attempt failure, and the process therefore moves to block 264 where the CMCF counter is incremented and checked against its maximum limit to determine whether to make another iterative attempt at connection or to fail the origination process altogether. The SMSF counter is also cleared (reset to zero) at this point so that the process described above for confirming successful SMS transmission is able to cycle through its specified number of iterations before being declared a failure.

As will be appreciated, by using the SMS retry timer in conjunction with the SMSF counter, the origination process includes a built-in retry strategy that can be used to efficiently make repeated messaging attempts to achieve successful transmission of the SMS message. This retry strategy can use one or both of the inner or outer loop iterative processes of FIG. 9 to re-attempt successful transmission of the SMS message. In the illustrated embodiment, the outer loop iterative process includes initially step 250 and then one or more iterations of steps 252-266, whereas the inner loop iterative process overlaps this process somewhat and uses steps 258-262 and steps 268-280 to repeatedly attempt to send the SMS message to the SMSC over the established connection. In other embodiments, these inner and outer loops can be implemented differently, using different points in the overall origination process to move from a determined successful outer loop into the inner loop that is ultimately used to confirm successful transmission of the SMS message.

Figure 10:
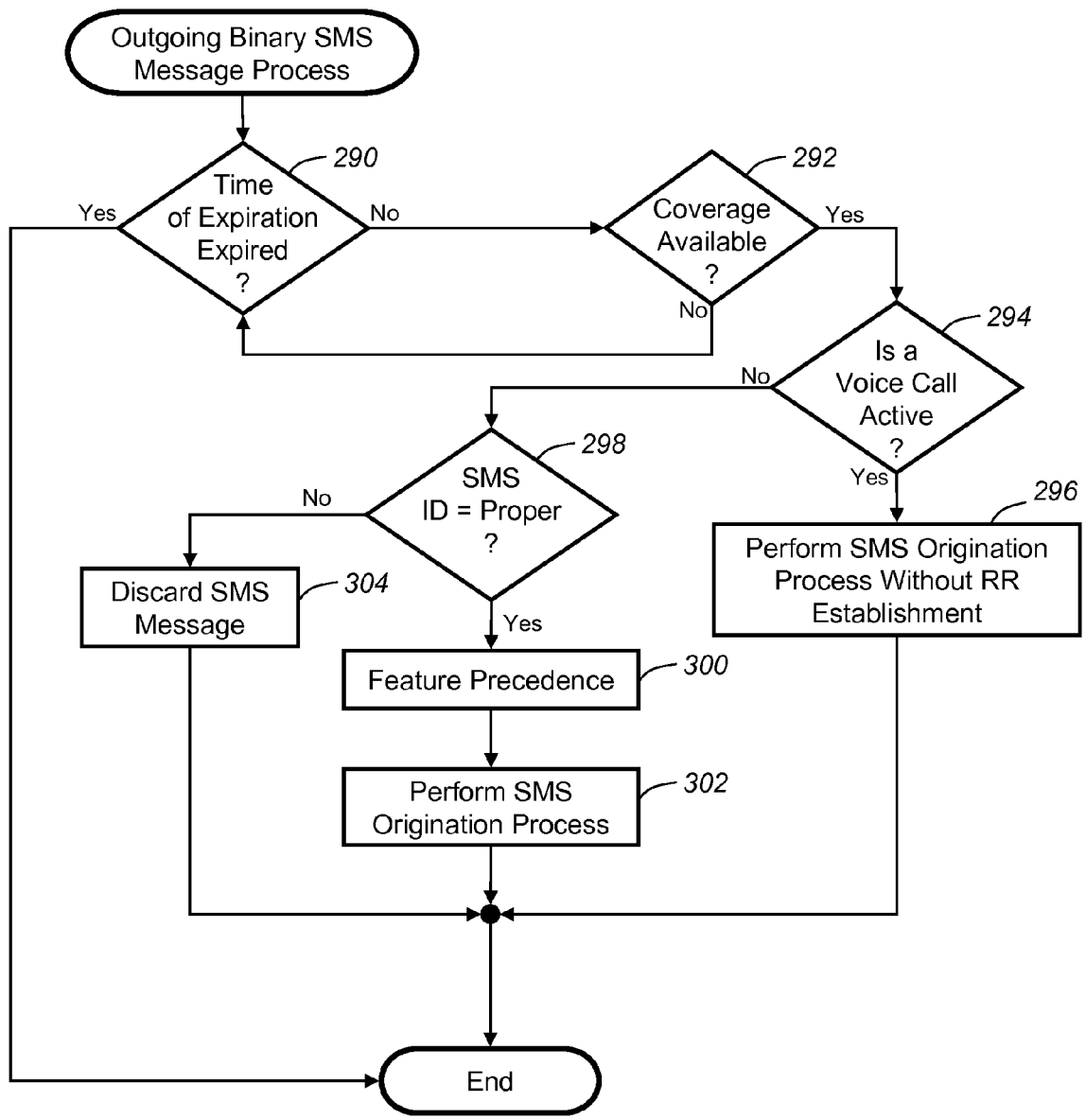
FIG. 10 is a flowchart of an SMS outgoing binary method that can be used for sending binary SMS messages from the vehicle telematics unit to the call center.

Apart from using the SMS origination process to send mobile originated text (e.g., ASCII) messages, it can also be used for binary messaging using the process of FIG. 10. As will be known to those skilled in the art, designation of a binary payload can be done using any suitable approach, such as by providing appropriate header information in the message. The first step 290 in the process is to determine if the SMS message being sent has a time of expiration (e.g., an absolute or relative date or time) that has already passed. If so, the process ends. If not, then the process moves to block 292 where a check is made to determine if coverage is available; for example, is there an attached base station. If not, the process loops back to check again on time expiration at block 290 and can continue in this loop until either coverage becomes available or the message expires. Instead of using an SMS expiration date/time, this expiration check at step 290 can be for a timer that allows the system to wait for available coverage, but timeout if none becomes available before expiration of the timer. Alternatively, a loop counter can be used to exit this loop. Assuming coverage is available or becomes available in time, the process moves to block 294 to determine whether an active voice call is in progress. This is used primarily to determine how the SMS origination will be carried out. For example, if a voice call is in progress, then the SMS origination does not require the whole connection management procedure involving a new radio resource connection, etc. Thus, at step 296, the SMS origination process 112 can be carried out starting at block 258.

Where no voice call is active, the process checks the SMS ID of the outgoing message at step 298. This can be useful where certain SMS IDs are used only for data transmission during a voice call, such as to provide the call center with a vehicle ID (VID) and/or current vehicle location (e.g., GPS coordinates) during a voice call with an advisor. Thus, the SMS IDs can be short (one or two digit) codes known to the VTU and call center to identify the message payload. If the SMS ID is not proper for use when no voice call is in effect, then the message is discarded at step 304. If instead the SMS has a proper ID, then the process moves to block 300 which is an optional feature precedence process that permits the VTU to determine priority between potentially conflicting requests. This can be used to ensure that more critical communications have priority both in terms of their call precedence and resource allocation. Thereafter, at step 302 the SMS origination process 112 is carried out as described above in connection with FIG. 9.

Figure 11A:
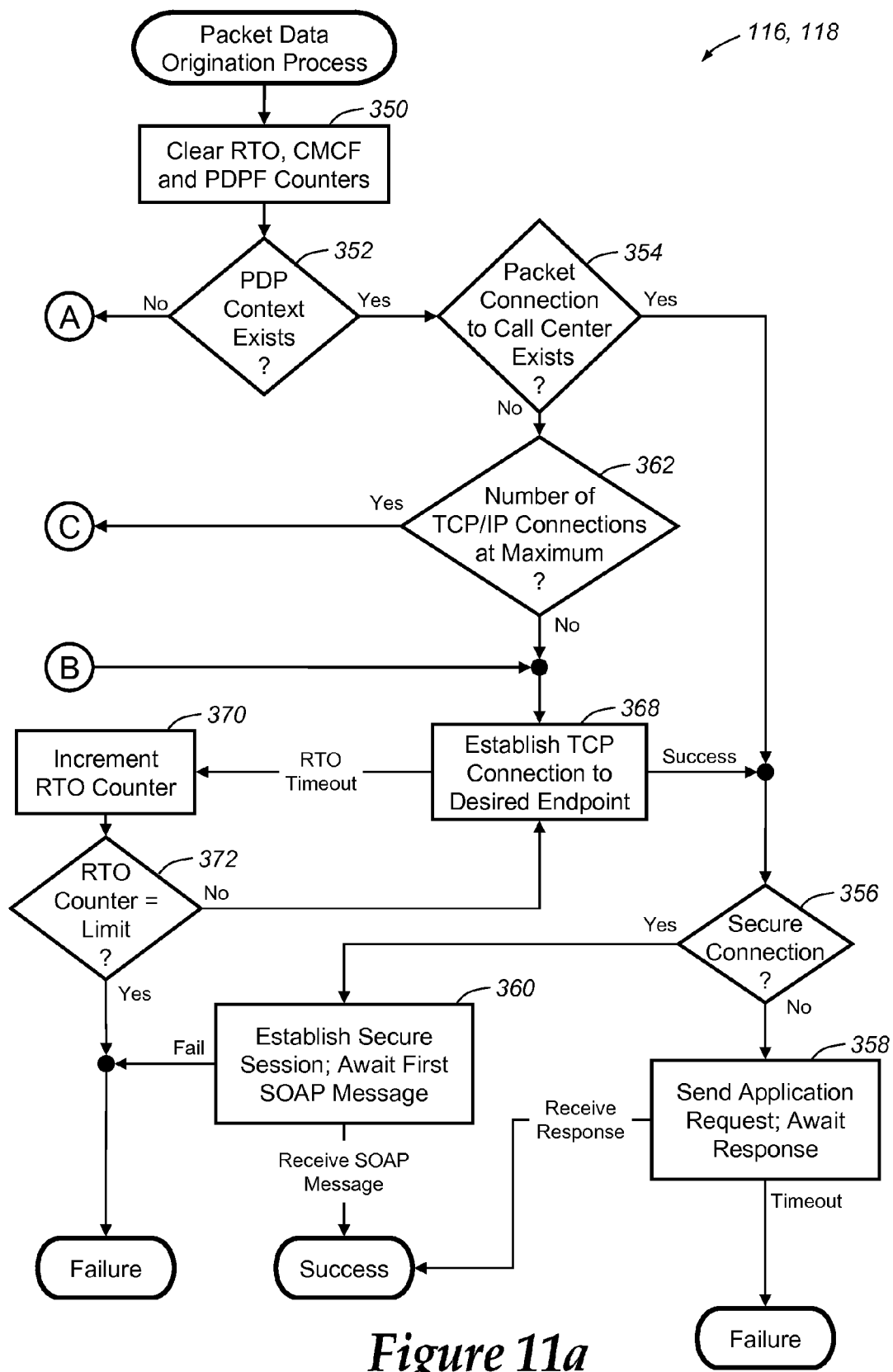
FIGS. 11a and 11b together comprise FIG. 11 which is a flowchart of a packet data origination method such as used by the packet data retry strategy of FIG. 11 to obtain a packet data connection between the vehicle telematics unit and call center.
Figure 11B:
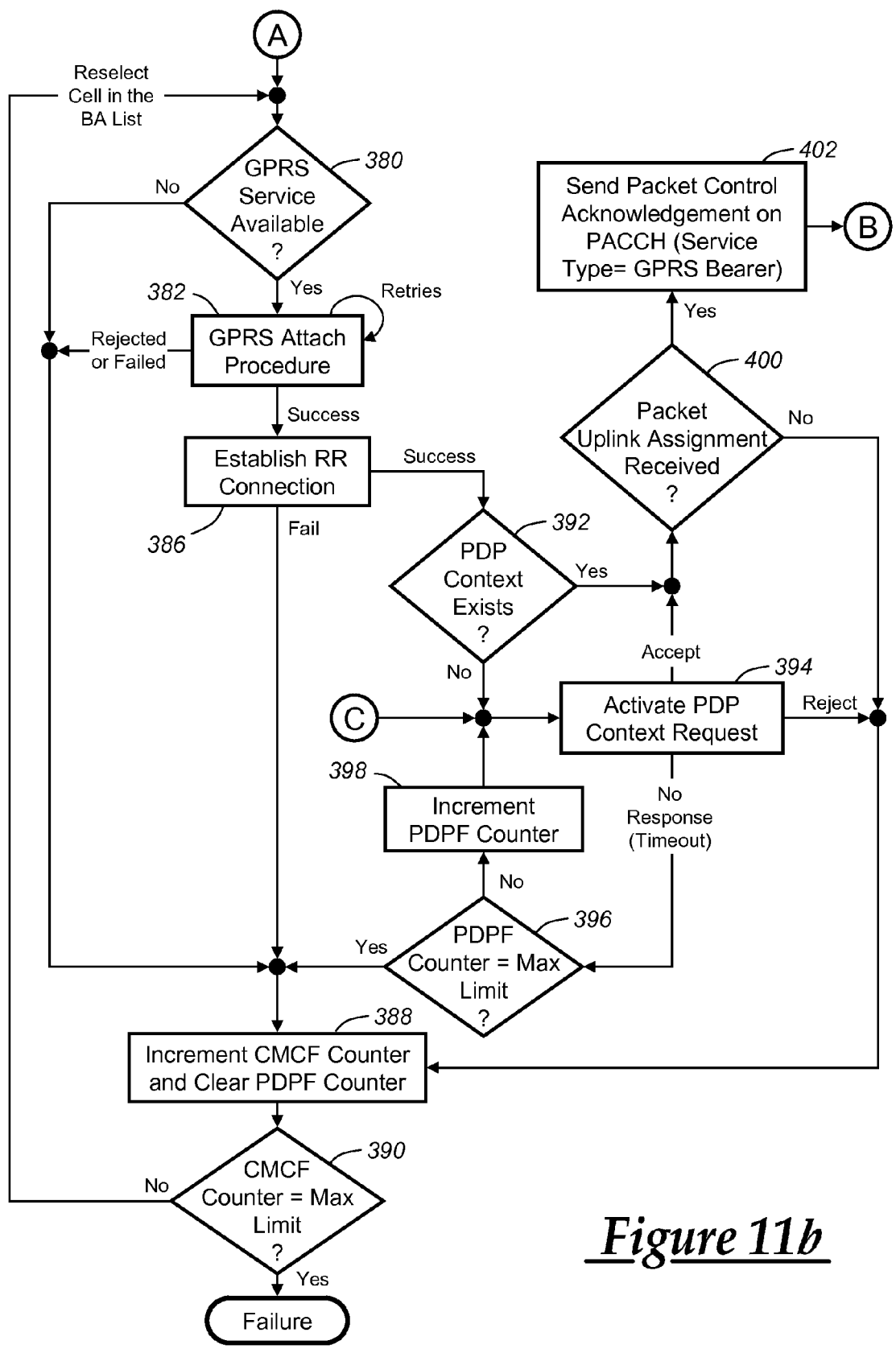

FIG. 11 depicts a packet data origination method that utilizes a packet retry strategy to help increase the probability of successfully originating a NVC packet data connection back to the call center or other desired endpoint equipment. This process can be used for the steps 116 and 118 of FIG. 2 in place of a more conventional origination approach. In general, the packet data origination method 118 first determines whether there is an existing packet data protocol (PDP) context, meaning that a unique data session is already setup. If not, the process carries out an attach and activation process to obtain a new PDP context. In either event, the PDP context is then used to obtain a packet data connection between the VTU and call center or other destination endpoint equipment. Once the packet data connection is established, it can be used by the VTU to send and receive packetized data. This method can be used with various wireless packet data communication approaches, but is especially useful for communicating via GPRS or EDGE over GPRS networks. Thus, the process described below will be discussed as it would be implemented using TCP/IP over a GPRS network. Like the cellular voice channel and SMS origination processes described above, the packet data origination process uses a nested iterative loop process to establish a connection to the GSM/GPRS network and complete the communication being sought by the VTU. The nested loops includes a connection management procedure and PDP context activation procedure with inner and outer loop counters that are used to permit the nested loops to iteratively repeat until either successful or the number of iterations reaches a specified maximum limit that can be predetermined or programmably adjusted, if desired.

The first step 350 is to clear the counters which include a retransmission timeout (RTO) counter and the nested loop counters, CMCF representing CM connect failures and PDPF representing PDP context failures. Then, at block 352, a first check is made to determine whether there is an existing PDP context activated on the registered PLMN. If so, the process moves on step 354 to check for an existing packet data connection between the VTU and call center (i.e., to the desired endpoint computer/device and port number). If there is a dormant or active packet data connection (e.g., one that is in the standby or ready state, respectively), then this fully established TCP/IP connection is used for data communication between the VTU and call center. For this, the process flows to step 356 where a check is made to determine if a secure connection is needed; that is, whether the data being transmitted across the NVC data connection needs to be encrypted or not. The determination of whether to encrypt the data or not can be made on the basis of the data being transmitted so that, for example, data relating to on-board vehicle navigation may not be encrypted whereas other data may not. If no encryption is needed, the process moves to step 358 where the VTU sends an application request or other packet data transmission and awaits the response, following which the process ends to allow the VTU and call center to exchange data over the successfully-established connection. If no response is received prior to expiration of a selected timeout period, the origination process is considered to have failed and can be repeated if desired or necessary. Where a secure connection is needed back at step 356, then the process moves to block 360 to establish a secure session. Encryption over this secure connection can be carried out in any suitable manner, such as by establishing the data connection as a TLS/SSL connection. In one embodiment, data transmission is via SOAP messaging over the secure sockets connection, with the VTU listening on the connected port for the call center to send the first SOAP message, as indicated at step 360. Upon receipt of this first SOAP message, the process is terminated successfully so that data transmission between the VTU and call center can occur. Failure to receive the SOAP message results in a failed termination of the process. In all cases with the packet data origination process is terminated as having failed, a GPRS detach procedure can be carried out.

If, back at step 354, there is no existing TCP/IP connection to the call center, then the process attempts to set one up and the process therefore moves to step 362 where a check is first made to determine if the number of active TCP/IP connections is at its maximum; that is, whether there are any active PDP contexts that do not have the maximum number of TCP/IP connections. The VTU can be configured to support a number (e.g., 5 or 6) of simultaneous TCP/IP connections for each PDP context, such that step 362 will check the one or more existing PDP contexts to determine whether each has its maximum number of connections. If so, the process jumps into the inner loop iterative process at step 394 where it attempts to activate a new PDP context which can then be used to establish the desired data connection. This will be described further below. If at step 362, the maximum number of TCI/IP connections has not been made, then the process moves to step 368 where a new TCP/IP connection is made between the VTU and call center (or other desired endpoint). If successfully established, then the process moves to step 356 and carries on as described above. If no successful packet data connection is established before expiration of an RTO timeout period, then the process moves to block 370 where the RTO counter is incremented and then checked at step 372 to determine if it has reached its specified maximum limit. The RTO timeout can be determined using a software timer that is started at step 368 at or about the time at which packet data is transmitted to the call center as a part of establishing the TCP/IP connection. If a timeout occurs before the new packet data connection is established but the counter has not yet reached its limit, then the process loops back to block 368 where another attempt is made to establish the new packet data connection. The process repeats until either the new TCP/IP connection is established or until the counter maxes out, in which case the process is terminated as having failed.

Where a new PDP context is needed, the nested iterative loop process of FIG. 11 is used. This begins at step 380 where the outer loop iterative process is begun with a check to determine if GPRS service is available. This can be done by using a GPRS indicator to determine if system information types 3, 4, or 13 are present. For example, this can be determined by examining the BCCH for either System Information Type 3 or 4, or for Packet Data System Information Type 13. If GPRS service is not available, the method moves to step 388 to increment the outer loop counter. If it is available, then the process moves to step 382 where a GPRS attach procedure is carried out per TS 24.008. If allowed by the ATT flag and network type in the System Information broadcast over the BCCH, the process at this point can carry out a combined IMSI/GPRS attach procedure, as will be known to those skilled in the art. If the GPRS attach procedure is rejected or otherwise fails, then it can be retried at this point a number of times (using a counter if desired) yielding either success or a repeated rejection/failure in which case the CMCF counter of step 388 is again incremented. As long as the CMCF counter limit has not been reached the VTU will carry out another iteration of the outer loop including another attempt at a GPRS attach, and this can be done by using the next cell/ARFCN in the BA list reselected by checking the GPRS service availability at step 380. If the GPRS attach procedure is successful, the process carries out a connection management procedure at block 386. This connection management procedure is similar to those discussed above in connection with cellular voice channel origination and SMS origination except that here it is used for packet data communication and so results in an assignment of a packet data channels (PDCH), and this can be done using known signaling methods between the VTU and base station. If the radio resource connection is not successful at step 386, then the process moves to block 388 where the CMCF counter is incremented (and the PDPF counter is reset). Then, at block 390 the CMCF counter is compared to its specified maximum limit and for a first iteration of the outer loop, process flow returns to step 386 to again attempt a radio resource connection. This repeating of the outer loop iterative process can be made after reselection of cells in the BA list and, if desired, this cell reselection can be carried out for each iteration of the process. If a successful radio resource connection is established, then the process moves to block 392 to determine if a PDP context exists. If not, the nested inner loop process is entered in which PDP context activation is attempted, as indicated at step 394. Upon transmitting a PDP context request, a standard T3380 thirty second timer is started. If this times out before the requested PDP context is acknowledged (with a reject or accept), then the PDPF counter is compared to its specified maximum limit at step 396 and, if not equal, is incremented at step 398 and another iterative loop of the PDP context activation process is repeated to again attempt to establish a successful data session. Note that the order of steps 396 and 398 can be reversed as done with the other counter loops, as this ordering merely impacts the number of actual iterations carried out before exiting for a particular maximum limit. If the PDPF counter reaches its limit, the process moves to step 388 where this failure of the inner loop is used to increment the outer loop counter CMCF, with the PDPF counter then being cleared back to zero for subsequent re-use the next time the PDP context activation procedure is carried out. This allows retries on another cell/ARFCN if the PDP activation is rejected.

If at step 394 the PDP context request is rejected (e.g., an "Activate PDP Context Reject" message is received), then the inner iterative process is terminated and the outer loop counter is incremented again. If it is accepted, then the process moves to step 400 to confirm that a packet uplink assignment has been made. This step can include checking for expiration of the T3162, T3186, and T3170 timers as well as for other failure causes per TS44.060. For example, if the packet data origination attempt being carried out at this point results in a response other than a packet cell change order, packet access reject, packet queuing notification, or packet uplink assignment, then the VTU can process the received order as specified in TS 44.060. Thus, as will be understood by those skilled in the art, if this process results in any failure to establish the Temporary Block Flow, then the process moves to block 388 to increment the CMFC counter, reset the PDPF counter, and attempt another iteration if the CMCF counter has not reached its maximum allowable. If, however, the Temporary Block Flow is established and a Packet Control Message is received on the downlink, then activation of the new packet data session is considered to have succeeded and the process moves to step 402 to send a packet control acknowledgement on the packet associated control channel (PACCH) per TS 44.060 Section 11.2.2. Thereafter, the process moves to block 368 to establish the TCP/IP connection and the process continues as described above.

With reference to FIG. 12, there is shown a voice fallback origination method such as can be used at step 142 of FIG. 4 in place of a more conventional voice channel connection method. This method is similar to the cellular voice channel origination method of FIG. 8 in terms of its connection management procedure, but does not include any inner loop iterative process once a successful connection with the call center is established. Thus, the process of steps 450-466 can be carried out in the same manner as that of steps 220-236, except that no DF counter is used in the voice fallback origination method. Assuming that this connection management procedure is successfully carried out prior to the CMCF counter reaching its limit and without the connect timer expiring during the current iteration of the loop, the process moves from block 462 to step 468 where the connect timer is stopped followed by sending of the connect acknowledgement message as step 470. Once a return acknowledgement is received at this point, the successful voice call to the call center can then be handled at step 472 by an advisor to provide services to the vehicle or vehicle occupants as needed. In general, the voice call can be considered successful when the VTU has established the voice channel or traffic channel for that call. If desired, the voice call can be switched to an in-band data call (IMCC call) by techniques known to those skilled in the art; for example, by the VTU detecting a modem carrier sent from the call center over the voice channel. In this case, the VID need not be sent to the call center, as is done in the method of FIG. 8. Also, if the voice call is successful, the VTU can separately originate a data connection, such as an SMS origination so as to send data, and this can be useful in emergency situations, for example, when the call is being originated as the result of a collision detection at the vehicle.

While on-line with the advisor, if a radio link failure occurs (e.g., due to a connection timeout or transmission failure), as detected at step 474, then a call re-establishment process 476 is carried out, and these steps can be carried out in the same manner as described above in connection with FIG. 8. If successful, then the process loops back to connect the call with an advisor at the call center, but if not, the process terminates as having failed. As will be appreciated by those skilled in the art, this voice fallback origination process permits the placement of a voice call to a fallback number stored at the vehicle, and this process can be done as a part of the tertiary connection method of FIG. 7 at step 212 in the event that the standard primary and secondary connection methods of FIG. 4 do not succeed, or as a way to originate the voice-only call at step 142 of FIG. 4.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, although the retry method of FIG. 4 and the connection methods of FIGS. 5-7 are used in the illustrated embodiment only for voice channel data and speech connections, one or more of them can be used for a NVC data connection as well. Thus, for example, a requested packet data connection can be carried out using the MRA method of FIG. 6 except that either a conventional origination process or one such as in FIG. 11 would be used in place of the voice channel origination process 190. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A cellular voice channel origination method for use by a vehicle telematics unit to provide a wireless communication from the telematics unit to a call center, comprising the steps of:
   (a) attempting a radio resource connection from the telematics unit to a wireless cellular system;
   (b) initiating a mobile originated call to a call center via the wireless cellular system;
   (c) monitoring at the telematics unit for receipt of a connect message;
   (d) sending a connect acknowledgement message in response to receipt of the connect message; and
   (e) attempting to establish a data mode session between the telematics unit and call center.

2. A cellular voice channel origination method as defined in claim 1, further comprising, prior to the step (b), the step of sending a service request via a standalone dedicated control channel of the wireless cellular system.

3. A cellular voice channel origination method as defined in claim 1, wherein step (c) further comprises monitoring for receipt of the connect message over a fast associated control channel of the wireless cellular system.

4. A cellular voice channel origination method as defined in claim 1, further comprising the step of carrying out multiple iterations of steps (a) through (c) until the connect message is received or until a specified maximum number of iterations have occurred.

5. A cellular voice channel origination method as defined in claim 1, wherein step (e) further comprises using a data compatible modem at the telematics unit to establish an in-band modem cellular connection between the telematics unit and call center.

6. A cellular voice channel origination method as defined in claim 5, wherein step (e) further comprises sending a vehicle ID over the mobile originated call, determining that the data mode session is successfully established in response to receiving an acknowledgement signal, and carrying out a call re-establishment procedure if the acknowledgement signal is not received.

7. A cellular voice channel origination method as defined in claim 5, further comprising the step of carrying out multiple iterations of steps (a) through (e) and incrementing a counter during each iteration if the acknowledgement signal is not received.

8. A cellular voice channel origination method as defined in claim 7, further comprising the step of incrementing a second counter if the first-mentioned counter equals a specified maximum limit.

9. A cellular voice channel origination method as defined in claim 1, further comprising the steps of starting a timer at least prior to step (b) and carrying out steps (c) through (e) if the timer has not expired prior to completion of step (b).

10. A cellular voice channel origination method as defined in claim 9, further comprising repeating steps (a) and (b) if the timer has expired prior to the completion of step (b).

11. A cellular voice channel origination method for use by a vehicle telematics unit to provide a wireless communication from the telematics unit to a call center, comprising the steps of:
    (a) initializing a counter;
    (b) starting a connection timer;
    (c) attempting a radio resource connection from the telematics unit to a wireless cellular system;
    (d) sending a service request via a standalone dedicated control channel of the wireless cellular system;
    (e) initiating a mobile originated call to a call center via the wireless cellular system;
    (f) monitoring at the telematics unit for receipt of a connect message over a fast associated control channel of the wireless cellular system;
    (g) incrementing the counter if the connect message is not received before expiration of the timer and then repeating steps (b) through (f) after incrementing the counter;
    (h) sending a connect acknowledgement message if the connect message is received;
    (i) attempting to establish a data mode session between the telematics unit and call center;
    (j) repeating at least steps (b) through (f) until the data mode session is successfully established or the counter reaches a specified maximum limit.

12. A cellular voice channel origination method as defined in claim 1, wherein said counter is a first counter, and wherein the method further comprises the steps of incrementing a second counter if the establishment of the data mode session in step (i) is not successful and thereafter incrementing the first counter if the second counter reaches a second specified maximum limit.

13. A cellular voice channel origination method as defined in claim 12, further comprising the steps of:
    determining that establishment of the data mode session in step (i) is not successful;
    determining whether there has been a radio link failure and, if so, incrementing the second counter.

14. A cellular voice channel origination method as defined in claim 13, further comprising the steps of:
    attempting re-establishment of the mobile originated call if there is a radio link failure and repeating steps (h) and (i) if the re-establishment is successful and incrementing the second counter if the re-establishment is not successful.

15. A cellular voice channel origination method as defined in claim 11, further comprising the step of incrementing the counter if the radio resource connection is not established.

* * * * *